(12) United States Patent
Legrand et al.

(10) Patent No.: US 10,395,294 B2
(45) Date of Patent: Aug. 27, 2019

(54) MANAGING PRE-COMPUTED SEARCH RESULTS

(71) Applicant: Amadeus S.A.S., Biot (FR)

(72) Inventors: Guillaume Legrand, Waltham, MA (US); Damien Ciabrini, Mouans-Sartoux (FR)

(73) Assignee: AMADEUS S.A.S., Biot (FR)

(*) Notice: Subject to any disclaimer, the term of this patent is extended or adjusted under 35 U.S.C. 154(b) by 1282 days.

(21) Appl. No.: 14/531,363

(22) Filed: Nov. 3, 2014

(65) Prior Publication Data

US 2016/0125497 A1    May 5, 2016

(51) Int. Cl.
*G06Q 30/06* (2012.01)
*G06F 16/242* (2019.01)
(Continued)

(52) U.S. Cl.
CPC ..... *G06Q 30/0625* (2013.01); *G06F 16/2425* (2019.01); *G06F 16/24575* (2019.01); *G06F 16/951* (2019.01); *G06Q 30/0631* (2013.01)

(58) Field of Classification Search
None
See application file for complete search history.

(56) References Cited

U.S. PATENT DOCUMENTS 8,943,043 B2 * 1/2015 Lymberopoulos ............. G06F 17/30902 707/721
9,128,988 B2 * 9/2015 Cheng .............. G06F 17/3053
(Continued)

FOREIGN PATENT DOCUMENTS

EP    2541473 A1    1/2013
WO    1999022315 A1    5/1999
(Continued)

OTHER PUBLICATIONS

Junghoo Cho and Hector Garcia-Molina. 2000. Synchronizing a database to improve freshness. In Proceedings of the 2000 ACM SIGMOD international conference on Management of data (SIGMOD '00). ACM, New York, NY, USA, 117-128. DOI=http://dx.doi.org/10.1145/342009.335391 (Year: 2000).*

(Continued)

*Primary Examiner* — Kathleen Palavecino
*Assistant Examiner* — Lance Y Cai
(74) *Attorney, Agent, or Firm* — Thompson Hine LLP

(57) ABSTRACT

Methods, systems, and computer program products for re-computing pre-computed search results, such as pre-computed priced recommendations. Pre-computed search results stored in a search platform are subdivided into shares of related pre-computed search results including a first share. A re-computation controller determines a validity trend indicating a change rate of a validity probability of a pre-computed search result over time and an instantaneous validity rate for the pre-computed search results. If a difference between the instantaneous validity rate and the validity trend exceeds a given extent, the re-computation controller adjusts the validity probabilities being associated with other pre-computed search results included in a second share correlated with the first share. The re-computation controller issues re-computation orders to a computation platform to re-compute a part of the pre-computed search results, the part being selected by the re-computation controller on the basis of the validity probabilities associated with the pre-computed search results.

17 Claims, 11 Drawing Sheets

(51) Int. Cl.
*G06F 16/951* (2019.01)
*G06F 16/2457* (2019.01)

(56) References Cited

U.S. PATENT DOCUMENTS

| | | |
|---|---|---|
| 2012/0330693 A1 | 12/2012 | Ciabrini et al. |
| 2013/0073586 A1 | 3/2013 | Aubry et al. |
| 2014/0052750 A1 | 2/2014 | Ciabrini et al. |

FOREIGN PATENT DOCUMENTS

| | | |
|---|---|---|
| WO | 2001033472 A2 | 5/2001 |
| WO | 2002025557 A2 | 3/2002 |
| WO | 2006074246 A2 | 7/2006 |
| WO | 2013160721 A1 | 10/2013 |
| WO | 20140026753 A1 | 2/2014 |

OTHER PUBLICATIONS

Junghoo Cho and Hector Garcia-Molina. 2000. Synchronizing a database to improve freshness. In Proceedings of the 2000 ACM SIGMOD international conference on Management of data (SIGMOD '00). ACM, New York, NY, USA, 117-128. DOI=http://dx.doi.org/10.1145/342009.335391 (Year: 2000).*

International Searching Authority, International Search Report issued in corresponding Application No. PCT/EP2015/002110, dated Jan. 7, 2016, 11 pages.

* cited by examiner

VALIDITY PROBABILITIES BASED ON VALIDITY TREND (PROBABILISTIC MODEL) AND INSTANTANEOUS VALIDITY RATE

| SHARE | DEP DATES | A<br>JUL | B<br>AUG | C<br>SEP | D<br>OCT | E<br>NOV | F<br>DEC |
|---|---|---|---|---|---|---|---|
| 1 | PAR-NYC | MODEL: 85% | MODEL: 87%<br>INSTANT: 85% | MODEL: 90% | MODEL: 93% | MODEL: 95%<br>INSTANT: 90% | MODEL: 99% |
| 2 | NCE-LON | MODEL: 82% | MODEL: 84% | MODEL: 85% | MODEL: 85%<br><u>INSTANT: 62%</u> | MODEL: 90% | MODEL: 98% |
| 3 | BOS-MIA | MODEL: 80% | MODEL: 91%<br>INSTANT: 95% | MODEL: 89%<br>INSTANT: 84% | MODEL: 95% | MODEL: 97% | MODEL: 97% |

MANAGING PRE-COMPUTED SEARCH RESULTS

BACKGROUND

The invention is generally related to computers and computer software, and in particular to methods, systems, and computer program products for re-computing pre-computed search results.

It is known to pre-compute search results and return pre-computed search results in response to search queries instead of only computing the search results at query time. In this way, response times can be shortened. Pre-computed search results have to be kept up-to-date in order to ensure that valid responses are returned. If the underlying data (being the basis for the pre-computation of the search results) changes, the pre-computed search results may get outdated and incorrect results would be returned. Thus, update strategies are employed to keep the pre-computed search results up-to-date.

A continuing need exists in the art for improved systems, as well as improved methods and computer program products, for re-computing pre-computed search results.

SUMMARY

According to an embodiment, a method of managing pre-computed priced travel recommendations is provided. The method is performed in a database environment. The database environment includes at least one search platform, a re-computation controller, and a computation platform. The search platform maintains pre-computed priced travel recommendations. The pre-computed priced travel recommendations are subdivided into a plurality of shares of related pre-computed priced travel recommendations including a first share D. The re-computation controller controls re-computation of the pre-computed priced travel recommendations on the basis of validity probabilities being associated with the pre-computed priced travel recommendations. The computation platform re-computes the pre-computed priced travel recommendations. The re-computation controller determines a validity trend $\lambda_i$ indicating a change rate of the validity probability of a pre-computed search result i over time. The pre-computed search result i is a member of the first share D. The validity trend $\lambda_i$ is derived from at least three past re-computations of i. The re-computation controller further determines an instantaneous validity rate $\hat{\lambda}_i$ for the pre-computed search result i. The instantaneous validity rate $\hat{\lambda}_i$ is derived from the two latest re-computations of the related pre-computed priced travel recommendations included in the first share D. In response to determining a difference between the instantaneous validity rate $\hat{\lambda}_i$ and the validity trend $\lambda_i$ exceeding a given extent, the re-computation controller adjusts the validity probabilities being associated with other pre-computed priced travel recommendations included in a second share D' being correlated to the first share D. Finally, the re-computation controller issues re-computation orders to the computation platform to re-compute a part of the pre-computed priced travel recommendations, the part being selected by the re-computation controller on the basis of the validity probabilities associated with the pre-computed priced travel recommendations.

According to another embodiment, a re-computation controller equipped with a respective functionality is provided.

According to yet another embodiment, a computer program is provided which, when executed on a computer system, performs the method as described above. The computer program may be stored as executable instructions on a non-transitory computer readable storage medium.

BRIEF DESCRIPTION OF THE SEVERAL VIEWS OF THE DRAWINGS

FIG. 10 shows an example of pre-computed search results with associated validity probabilities.

DETAILED DESCRIPTION

Before turning to the detailed description with reference to FIGS. 7 to 13, some more general aspects will be set forth first with reference to FIGS. 1 to 6.

The methodologies described herein relate to database systems that offer pre-computed search results (e.g., pre-computed priced travel recommendations responsive to queries in travel search or travel shopping applications) to clients. The technical aim of pre-computation is generally to decrease response times for responding to search queries, such as search queries for priced travel recommendations. Hereinafter, the terms "pre-computation" and "pre-computed" are used to cover any sort of pre-computation and pre-collection such as Internet crawlers collecting or copying the content of Internet web servers, but also complex and time-intensive computations of search results on the basis of underlying data as it is e.g., described for priced travel recommendations by International Publication No. 2014026753 and U.S. Publication No. 20120330693, which are each hereby incorporated by reference herein in its entirety. The term "database" is meant to encompass any types of structured information storage system such as standard stand-alone databases like SQL server or Oracle databases as well as complex, distributed and/or proprietary storage systems, relational databases including database management systems or object-oriented database systems and the like.

Figure 1:
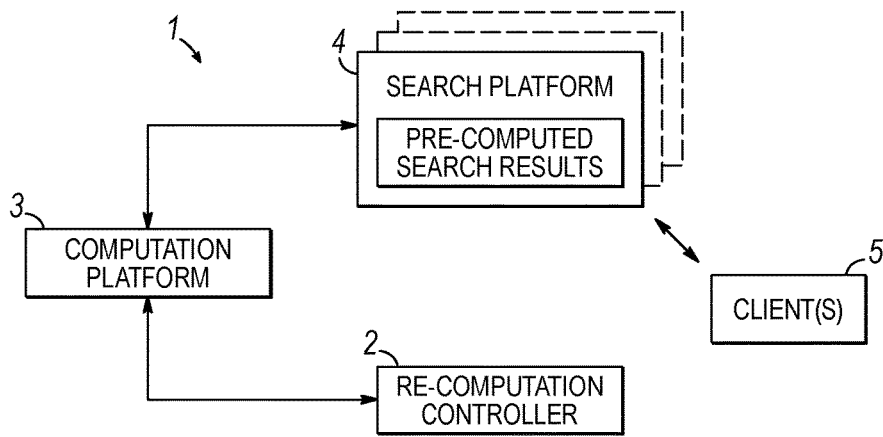
FIG. 1 schematically shows the basic architecture of a database environment.

The architecture of an exemplary database system 1 is shown by FIG. 1. The database system 1 includes one or more clients 5 and at least one search platform 4. To increase failure safety and/or performance, a plurality of search platforms 4 may be present. The at least one search platform 4 maintains pre-computed search results in order to decrease response times to answer search queries received from the clients 5.

The client 5 directs search queries to the search platform 4, each search query including one or more search criteria constraining the search. For example, if a search query is an Internet search, the search query might carry a search string, search text or search phrase as search criteria. A further search criterion may be the language of websites to be searched or an indication of a point of time of the first availability of the requested search string, search text or search phrase. According to another example, the search query is a database request for a product or service offered by a service provider platform such as an Internet book store or a travel provider. In that case, the search query might include e.g., an upper price limit or a price range for the service or product and desired characteristics of the product/service such as book title, travel origin and destination, etc.

The search platform 4 processes a search query received from the client 5 and performs a database search within the pre-computed search results (e.g., pre-computed priced travel recommendations). In turn, search platform 4 responds with one or more pre-computed search results that are identified as fulfilling the search criteria included in the search query. The manner of the processing performed by the search platform 4 is not relevant for the methodologies herein, e.g., whether the search platform 4 retrieves only pre-computed search results strictly complying with the search criteria included in the search query or, e.g., whether the search platform 4 implements a fuzzy search and thus also returns fuzzy results beyond the constraints of the search criteria to a given extent. The client 5 receives this response and processes the response, e.g., presents the search results to the user.

Pre-computed search results may get outdated (hereinafter also referred to as invalidated) after a certain time subsequent to their pre-computation. Generally, the cause of invalidation is a change in the underlying or original data. For example, the content of a web server may change at a certain point of time or fares underlying pre-computed priced travel recommendations (e.g., priced sets of flights forming a travel) may be updated from time to time. From these points of time onwards, the corresponding pre-computed search results stored in the search platform 4 being affected by the change of the underlying data are invalid. Hence, clients 5 provided with these invalid pre-computed search results would receive incorrect answers to their search queries. The general solution of this invalidation problem is to re-compute the pre-computed search results in a regular, irregular or continuous manner.

The pre-computation of search results is managed by re-computation controller 2. Re-computation controller 2 may be provided as an individual entity (as shown by FIG. 1) or may, alternatively, be integrated into one or (if present) multiple search platforms 4. As the computation resources for re-computation are generally limited, the pre-computed search results need to be prioritized, i.e., only a portion of all pre-computed search results maintained by the search platform 4 can be re-computed within a certain period of time. Hence, the re-computation controller 2 performs a selection of certain portions of the pre-computed search results for re-computation. To this end, the re-computation controller 2 manages the re-computation of the pre-computed search results in accordance with a re-computation strategy as, for example, being described by International Publication No. 2014026753. In accordance with the re-computation strategy employed, the re-computation controller 2 generates and transmits re-computation orders to the computation platform 3, the re-computation orders indicating to the computation platform 3 which pre-computed search results are to be re-computed. In response to receiving a re-computation order from the re-computation controller 2, the computation platform 3 executes the re-computation, e.g., by requesting original data corresponding to the pre-computed search results from primary data sources and/or performing a re-calculation of the respective search results on the basis of underlying data.

The re-computation strategy may be based on a probabilistic model. Generally, such probabilistic models may include, for example, parameters such as an age, a popularity (an access rate to the pre-computed search result by querying clients 5), a decrease rate of a validity probability, an initial accuracy (a probability of the pre-computed result of being valid at the time it is pre-computed) of any of the pre-computed search results, etc. which are permanently stored and updated by re-computation controller 2 or another entity coupled to re-computation controller 2. A probabilistic model may be based on statistical experience of the behavior of the pre-computed search results or may be formed in a conceptual manner on the basis of subject-matter experience. Generally, a probabilistic model may be used to approximate the validity of pre-computed search results as a function of time. This approximated validity is hereinafter referred to as validity probability. In general, the validity probability of a pre-computed search result decreases with time passing after the pre-computation of the search result.

Figure 2:
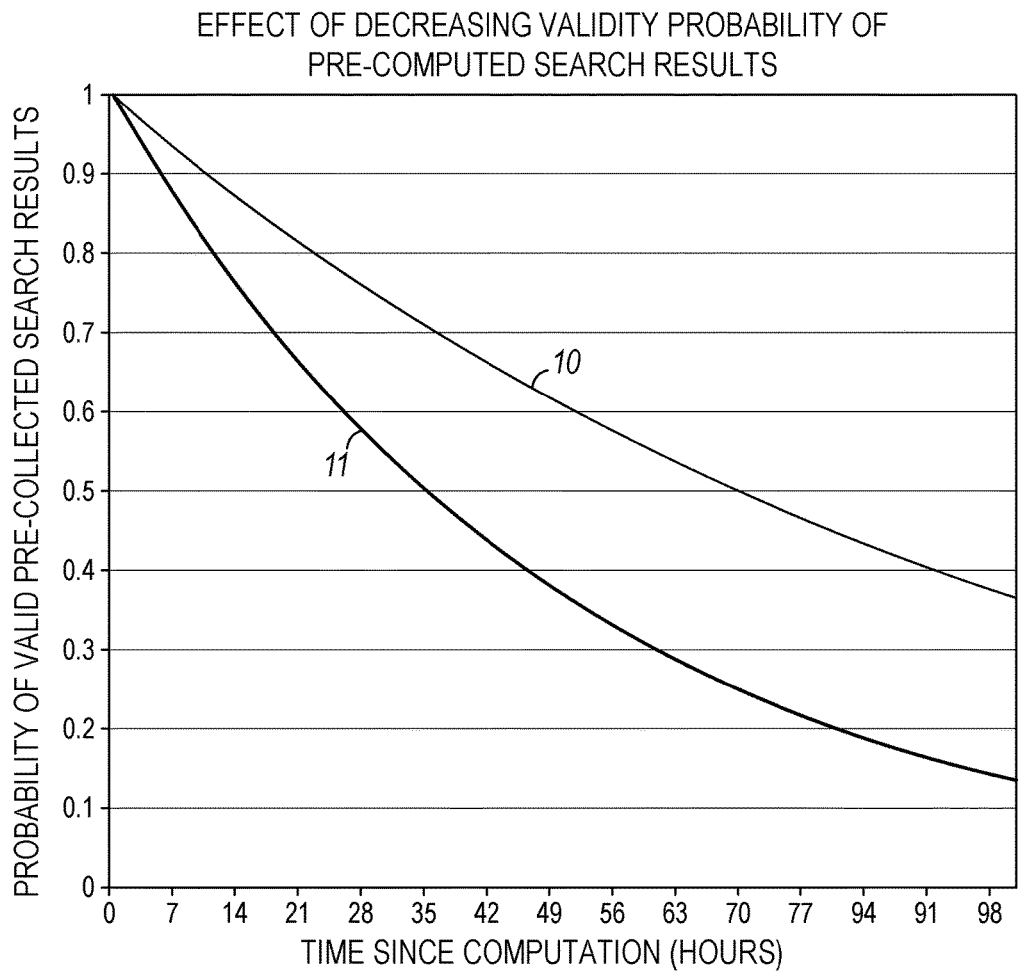
FIG. 2 illustrates the effect of decreasing validity probability of pre-computed search results over time.

Two exemplary functions of the validity probability decreasing over time are depicted by FIG. 2. Function 10 represents a pre-computed search result that potentially stays at a higher probability of being valid over time than another pre-computed search result associated with function 11. For example, the pre-computed search result represented by function 10 has 70% probability of being still valid at 35 hours after its last re-computation, while the other pre-computed search result characterized by function 11 is only valid up to about 50% at 35 hours after its latest re-computation. Functions 10 and 11 may also represent whole sets of pre-computed search results (such as shares as described further below) and then indicate proportions of the sets of pre-computed search results likely being valid at a time passed since the last re-computation of the set.

Probabilistic models, however, do not reflect unexpected or unpredictable events which can substantially decrease the validity of the pre-computed search results, i.e., significant portions of the pre-computed search results could be invalidated upon the occurrence of an event. Due to their characteristics of being unexpected or unpredicted, such events are generally not included in probabilistic models. Assuming the example of the pre-computed search results being travel-related data such as priced travel recommendations, examples of such events having an impact on the validity of pre-computed search results are real-life situations such as a trade fair or a sport event (which, e.g., increase the price of flights on certain dates and for certain locations) or random events such as strikes or natural disasters (which may lead to cancellations of flights), all of which change the presumptions underlying the causalities of the probabilistic model. Assuming another example of the pre-computed search results being pre-collected Internet websites, examples of events leading to invalidity of parts of the pre-computed search results are a political campaign causing a blocking of certain (types of) websites or a technical blackout causing Internet servers located in a certain geographical area going offline for a longer period of time. If the pre-computed search results are e.g., geographical and weather-related data such as river and sea water levels or air pollution information, portion of the pre-computed search results may be invalidated due to a natural disaster such as a tsunami or a volcano eruption.

Known solutions considering such asynchronous real-time events potentially invalidating certain parts of the pre-computed search results rely on an external signalization of such events, as e.g., described by International Publication No. 2014026753. However, such external signalization might not always be possible or desired e.g., due to the absence of interconnected systems, adequate technical interfaces or unknown impact of the events on the validity of the pre-computed search results. Beyond an external signalization, the disclosure in International Publication No. 2014026753 also considers an implicit recognition of asynchronous real-time events by employing a sampling mechanism. To this end, certain representative parts of the pre-computed search results (samples) are intentionally re-computed from time to time in order to determine whether a larger part of the pre-computed search results represented by a sample has a significantly lower actual validity than indicated by the probabilistic model. However, determining the actual validity by such sampling process requires additional re-computation resources which are consumed at the expense of re-computing the most critical pre-computed search results as prescribed by the re-computation strategy, e.g., the pre-computed search results with the lowest validity probability.

Against the background of these technological issues of pre-computed search results getting invalid over time, re-computation strategies on the basis of probabilistic models and consideration and recognition of real-time events influencing the validity of the pre-computed search results beyond what is reflected by the probabilistic model, an efficient way (in terms of computing resources) is proposed herein to implicitly recognizing validity decreases within pre-computed search results, potentially being caused by asynchronous real-time events. Neither external signaling nor computing-resource-intensive sampling are necessary.

In brief, at a general level, the present solution is based on the determination of a probabilistic model parameter in form of a validity trend indicating a decrease rate or retention rate of the validity probability of the pre-computed search results over time (e.g., as indicated by the example functions of FIG. 2), the determination of an instantaneous validity rate indicating an instant validity of a first share of the pre-computed search results and a pre-computed search result within this first share, respectively, a comparison of the instantaneous validity rate with the validity trend and a determination whether or not the difference between the instantaneous validity rate differs from the validity trend more than a given extent, an adjustment of the validity probabilities of pre-computed search results of a second share different from, but correlated to the first share, if the difference between the instantaneous validity rate and the validity exceeds the given extent, and re-computing the pre-computed search results in accordance with a given re-computation strategy dependent on the validity probabilities associated with the pre-computed search results. Consequently, the potentially adjusted validity probabilities of the pre-computed search results in the second share are taken into account when deciding which pre-computed search results are to be re-computed.

Hence, the main idea of this mechanism is to use validity probability correlations between the pre-computed search results and to transfer a detected substantial discrepancy between the validity indication provided by the probabilistic model and an instant validity indication of a first share of pre-computed search results to a second share of pre-computed search results correlated with the first share of pre-computed search results. In this way, for example, a sampling process for the second share of pre-computed search results is rendered obsolete. In particular, it is possible to derive the instant validity indication for the first share in response to a "normal" re-computation of pre-computed search results in the first share, "normal" here meaning that this re-computation is in line with the re-computation strategy employed as opposed to an additional artificial sampling re-computation or the like. Hence, re-computation overhead can be reduced or avoided at all.

Before turning to the detailed description of implementation examples, these features are described next in some more detail on a functional level first.

As already described above, the search platform 4 stores the pre-computed search results (e.g., pre-computed priced travel recommendations). A representation of the pre-computed search results is also maintained by the re-computation controller 2 for re-computation control purposes. In particular, the re-computation controller 2 maintains control data for employing the re-computation strategy. The control data enables the re-computation controller 2 to determine validity probabilities of the pre-computed search results and to e.g., regularly initiate re-computation of a portion of the pre-computed search results in accordance with the re-computation strategy, e.g., pre-computed search results having the lowest validity probability. Parameters for determining the validity probabilities of the pre-computed search results are, for example, the time of the last re-computation and a decrease function for the validity probability as exemplary shown by FIG. 2, for example $e^{-\lambda_i t_i}$, $\lambda_i$ denoting a validity trend of a particular pre-computed search result i modeled by a probabilistic model and $t_i$ denoting a time (number of time units) passed since the last re-computation of the pre-computed search result i. By storing these two parameters $\lambda_i$ and $t_i$ for any pre-computed search result (or sets of pre-computed search results), the re-computation controller 2 is able to calculate the validity probability of the pre-computed search result i at any given point of time. The term "validity trend" as used herein relates to a decrease rate of the validity probability over time (in examples also covered herein, it may also represent a maintenance rate of the validity probability over time). Furthermore, it is noted that the re-computation controller 2 may permanently store and maintain the parameters $\lambda_i$ and the re-computation time stamp of each pre-computed search result, but not the parameters $t_i$ and validity probability resulting from the above-mentioned exemplary functions. Rather, the latter two values can be calculated dynamically on demand, as $t_i$=current time—re-computation and the validity probability value depends on $\lambda_i$ and $t_i$ as, e.g., given by the above-mentioned functions.

Figure 3:
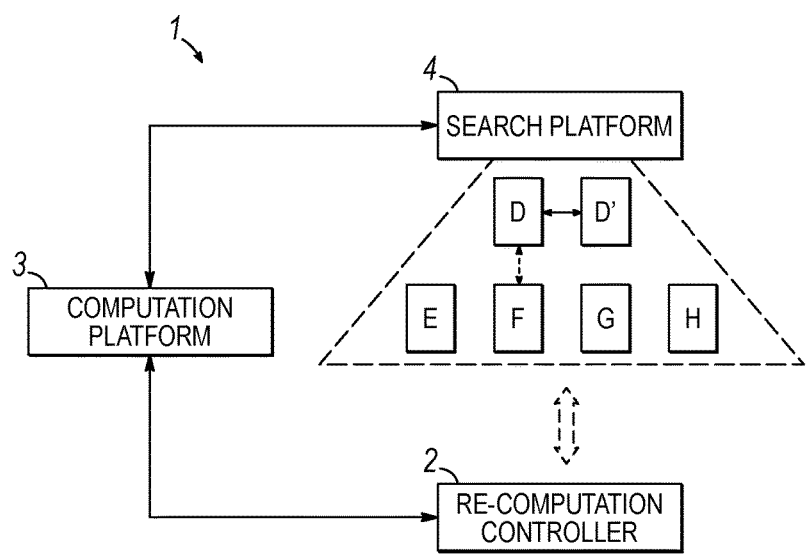
FIG. 3 presents a more detailed view on the structure of the pre-computed search results maintained by the search platform.

Generally, the pre-computed search results are subdivided into shares, as shown by FIG. 3 indicating exemplary shares D, D', E, F, G and H. The pre-computed search results within a share have similar invalidation characteristics, i.e., they have identical or similar validity trends $\lambda_i$ and, thus, identical or similar change functions for the validity probability. For example, if the pre-computed search results are priced travel recommendations, a share of pre-computed search results may be formed by all priced travel recommendations with a particular origin and destination location and having e.g., departure dates within a given timeframe, e.g., one month (such as travel recommendations between the city pair Nice—New York departing in August 2014). If, for example, the pre-computed search results are data records indicating environmental parameters such as water levels and air pollution, a share may be formed by pre-computed search results of a particular geographic region. The number of pre-computed search results within a share, as well as the number of shares, depends on the particular embodiment of the database system 1. A share may include any number of pre-computed search results (e.g., pre-computed priced travel recommendations).

The decomposition of the pre-computed search results into share may be reflected by the database model and structure of the search platform 4. For example, each group of pre-computed search results forming a share may be kept in a dedicated table (or other suitable database structure). Alternative, the pre-computed search results may include a parameter indicating the share to which they belong. In this case, each database record includes a share field. As a further alternative, the shares may be defined by a separate data structure such as a share table defining which pre-computed search result is associated with which share. Other ways of defining the shares such as a logical definition by rules without a reflection in the database model and structure are also covered herein and not excluded by these examples.

Furthermore, a correlation may also exist at the level of shares. The pre-computed search results of a first share, e.g., share D of FIG. 3, may have validity trends $\lambda_i$ and, thus, decrease functions for the validity probability similar to the pre-computed search results in another share, e.g., share D' of FIG. 3 (indicated in FIG. 3. by the solid arrow between share D and share D'). For example, the average validity trend of all pre-computed search results in the first share D are close to the average validity trend of all pre-computed search results in the second share D' ($\lambda_D=0.1$ and $\lambda_{D'}=0.11$) e.g., and, in addition, the pre-computed search results in the first share D and the pre-computed search results in the second share D' are inter-linked in terms of validity behavior, i.e., if a substantial part of the pre-computed search results in the first share D is invalid, it is likely that a substantial part of the pre-computed search results in the second share D' is invalid as well. For example, if the pre-computed search results are priced travel recommendations, share D may include all pre-computed priced travel recommendations for the city pair Nice—New York with departure dates in August 2014 and share D' may include the pre-computed priced travel recommendations for the same city pair Nice—New York with departure dates in September 2014. If, for example, the pre-computed search results are data records indicating environmental parameters such as water levels and air pollution, shares D and D' may be formed by data records relating to geographically adjacent regions such as two neighboring counties.

Moreover, there may be different levels of correlation between shares. For example, shares D and D' of FIG. 3 and of the examples given below are strongly correlated and, thus, the pre-computed search results in the first share D and the pre-computed search results in the second share D' may have nearly identical validity characteristics. Another share, for example share F of FIG. 3, may still be correlated with share D, but the correlation between share D and F may be less strong than the correlation between share D and share D'. For example, if the pre-computed search results are priced travel recommendations, share D may include all pre-computed priced travel recommendations for the city pair Nice—New York with departure dates in August 2014 and share F may include the pre-computed priced travel recommendations for the same city pair Nice—New York with departure dates in October 2014. If, for example, the pre-computed search results are data records indicating environmental parameters such as water levels and air pollution, shares D and F may be formed by data records relating to regions which are still geographically close to each other, but not directly adjacent. A specific example for determining the correlation between two shares of pre-computed search results is given further below.

For reasons of illustration, the following description refers to an individual exemplary pre-computed search result i that is included in the share D as shown by FIG. 3. However, the following statements likewise apply to any pre-computed search result included in any share.

Determining the Validity Trend

In one aspect, the re-computation controller 2 maintains a probabilistic model for the pre-computed search results. For any pre-computed search result i, the re-computation controller 2 determines a validity trend $\lambda_i$ which indicates a decrease rate of the validity probability of the pre-computed search result i. For example, the pre-computed search result i may have a validity decrease rate of 10% per hour meaning that the probability of i being valid decreases by 10% every hour ($\lambda_i=0.1$). At the time of its first computation or re-computation, i is generally 100% valid (assuming an initial accuracy of 1). After one hour, i is still valid with a probability of 90%. After two hours the validity of i is 81% (=90% decreased by another 10%). After three hours, i's probable validity is at 72.9%, and so on. Hence, the validity trend $\lambda_i$ is a measure of how long the pre-computed search result i remains valid or how fast the pre-computed search result i becomes invalid due to changes of the underlying original data.

The validity trend $\lambda_i$ models the validity based on long-term experience of the validity development of the pre-computed search result i. The value of validity trend $\lambda_i$ for a particular pre-computed search result i is therefore determined from at least three past re-computations of i. The higher the number of past re-computations taken into account for the determination of $\lambda_i$ is, the more reliable is the value of $\lambda_i$. The re-computation controller stores the validity trend $\lambda_i$ as a control data parameter for the pre-computed search result i.

One difficulty to determine the validity trend $\lambda_i$ is the fact that the re-computation of the pre-computed search result i does generally not occur in equidistant time intervals. In particular, varying time periods may pass between two subsequent re-computations of i, depending on the re-computation strategy employed.

Figure 4A:
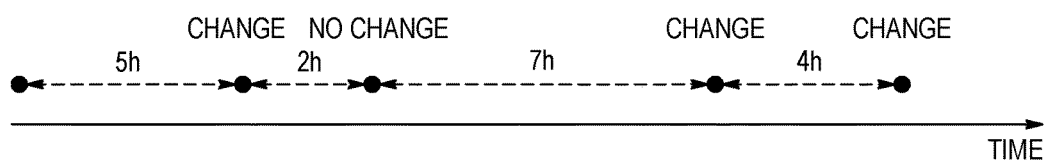
FIGS. 4A and 4B visualize inequidistant time intervals between several successive re-computations of a pre-computed search result.

An example is given by FIG. 4A showing a series of successive re-computations of pre-computed search result i. In this example, the first re-computation occurs five hours after the previous computation of i. The re-computation shows that the pre-computed search result i has changed. However, the re-computation does not indicate at which specific point of time during this time interval of five hours between the previous computation and the first re-computation the pre-computed search result i was actually invalidated. Then, the next (second) re-computation of i takes place two hours later. The re-computation shows that i was still valid (i.e., the re-computation of i was actually unnecessary). Subsequently, the pre-computed search result i is not re-computed after another seven hours time period has passed.

This third re-computation again indicates that i has changed, i.e., i was invalidated at some (unknown) point of time in the seven-hour window. The final (fourth) re-computation of i then occurs four hours later. Again, the pre-computed search result i has changed in the meantime, at some point of time in the four-hour time interval.

As it is illustrated by this example, it is thus generally uncertain at which exact point of time the pre-computed search result i was invalidated if a re-computation of i after a certain period of time indicates that i was not valid anymore.

Several possibilities exist to deal with this problem in determining the validity trend $\lambda_i$. One option is to re-compute the pre-computed search result i regularly in relatively short equidistant time intervals for a certain limited period of time (for example, once every hour for a time period of four weeks). In this way, $\lambda_i$ can be determined in a systematic manner. However, these re-computations are artificial and thus consume a substantial amount of additional re-computation resources.

Figure 4B:
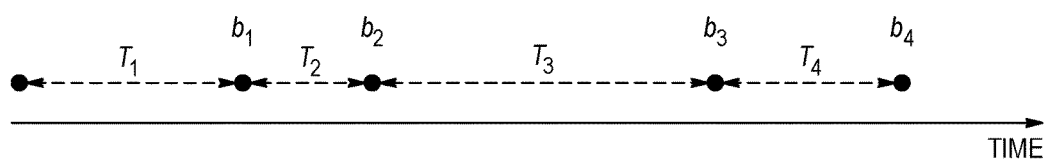

Hence, alternatively or in addition, statistical measures may be employed to derive $\lambda_i$ from the generally inequidistant re-computations of i within the re-computation strategy employed. As used herein, inequidistant means that the re-computations are performed at unequal time intervals. In some embodiments, a maximum likelihood estimation of an expected value for $\lambda_i$ is performed to this end. The maximum likelihood estimation is based on a series of re-computation pairs of i. Each re-computation pair includes a time since the last re-computation of i and a flag indicating whether or not i has changed since the last re-computation of i. FIG. 4B introduces a formal notation of such series of re-computation pairs according to which the time since the last n-th re-computation of i is denoted as $T_n$ and the change flag is denoted as $b_n$. Referring back to the example of FIG. 4A, the re-computation series of FIG. 4A can be specified as the set of tuples $\{T_1=300, b_1=0; T_2=120, b_2=1; T_3=420, b_3=0; T_4=240, b_4=0\}$, $T_n$ given in minutes and $b_n=0$ indicating that the pre-computed search result i was invalid before the re-computation and $b_n=1$ indicating that the pre-computed search result was still valid. In some embodiments, the re-computation controller 2 keeps such data reflecting the past re-computations as control data for any pre-computed search results stored in the search platform 4 and updates/extends this data in the course of any re-computation.

The maximum likelihood estimation estimates the value of the validity trend $\lambda_i$ for a pre-computed search result i by establishing the likelihood function of the validity trend value $\lambda_i$ to be estimated being in line with the observed history data and by determining a maximum value of this function. The result is an "educated best guess" of the true value of the validity trend $\lambda_i$. In some of these embodiments, a confidence value for the validity trend $\lambda_i$ estimated by the maximum likelihood method is calculated. This confidence value enables assessment the potential deviation of the value of $\lambda_i$ estimated by the maximum likelihood method from the true value of $\lambda_i$. This is, for example, realized by utilizing the observed Fisher information to evaluate the probability that the true value of $\lambda_i$ is located in a confidence interval. A detailed example of applying the maximum likelihood estimation to estimate the validity trend $\lambda_i$ and to obtain a confidence factor is described further below.

In other embodiments, the validity trend $\lambda_i$ is determined by establishing an empirical distribution function of the probability for the pre-computed search result i to stay valid over time and by then regressing the empirical distribution function. This approach empirically estimates discrete values for the validity probability at particular points of time after a re-computation of the pre-computed search result i. To this end, time intervals may be defined spanning a re-computation point of time. Then, sliding windows of varying size are shifted along the time intervals and a probability that the pre-computed search result i is not invalidated within time interval is assessed for each of the varying window sizes. This yields a sequence of individual validity probability values at particular points of time from which a continuous function is derived by using regression. The option of determining the validity trend $\lambda_i$ by establishing an empirical distribution function is explained in more detail further below with reference to FIGS. 7 to 9.

In order to achieve an efficient (in terms of processing time and utilization of computation resources) implementation of the validity trend $\lambda_i$ determination, some embodiments use MapReduce processes. MapReduce is a programming model and a corresponding implementation for processing and generating large data sets with a parallel, distributed algorithm e.g., by a database system. A MapReduce program includes Map procedures and Reduce procedures. First, a Map( ) procedure performs filtering and sorting (such as sorting priced travel recommendations by departure origin-destination pairs, one queue for each origin-destination pair). Second, a Reduce( ) procedure is performed that realizes a summary operation (such as counting the number of priced travel recommendations in each queue). MapReduce (also includes running various tasks in parallel, managing communications and data transfers between the various parts of the implementing database system, and beneficially facilitates parallel execution, scalability, redundancy, and fault tolerance. Thus, the present example can be advantageously used if the validity trend $\lambda_i$ (and/or the instantaneous validity rate $\hat{\lambda}_i$) of a large number of pre-computed search results (e.g., hundreds of thousands or millions of priced travel recommendations involving corresponding re-computation history data e.g., in the order of the last 100 re-computations of each priced travel recommendation) is to be determined. Any available MapReduce libraries such as, for example, conveyed by Apache Hadoop, can be used to implement the present example. A particular example of employing the MapReduce paradigm for determining the validity trend $\lambda_i$ by establishing and regressing the empirical distribution function is given further below.

It is noted that the validity trend $\lambda_i$ is not necessarily a number being specific to an individual pre-computed search result i. Rather, the validity trend $\lambda_i$ may describe the validity probability (after a certain time passed since the last re-computation) of a whole set of pre-computed search results such as a share of pre-computed search results, a sub-portion of a share of pre-computed search results or several shares of pre-computed search results. For example, a validity trend value $\lambda$ may be an aggregated value for a set of pre-computed search results such as a common validity trend $\lambda_{Davg}$ for the pre-computed search results of the first share D. To this end, several related pre-computed search results are considered together in order to obtain their common validity trend value. Referring back to the example of FIG. 4B discussed above, not only the re-computation history of the pre-computed search result i {T1, b1; T2, b2; T3, b3; T4, b4}(see FIG. 4A), but also at the re-computation history of a pre-computed search result i' related to i: {T1', b1'; T2', b2'; T3', b3'} is taken into account. A validity trend value common for both pre-computed search results i and i' is estimated based on {T1, b1; T2, b2; T3, b3; T4, b4; T1', b1'; T2', b2'; T3', b3'}. This can be generalized to more than two pre-computed search results (provided that they are related as described above with reference to FIG. 3) such as all pre-computed search results within a share D. In order to obtain statistically relevant numbers, there is generally a tradeoff between validity trend values specific to one (or few) pre-computed search results which requires to base the estimation on a longer re-computation history (in order to have a significant number of tuples) and estimating validity trend values common to a greater number of related pre-computed search results which only requires to take into account a more recent re-computation history.

Thus, in some embodiments, the validity trend $\lambda_i$ of a particular pre-computed search result i included in the first share D is derived from the common validity trend $\lambda_{Davg}$ for the pre-computed search results of the first share D, e.g., $\lambda_i = \lambda_{Davg}$. In these embodiments, validity trends are thus only determined at the level of shares, but not for individual search results.

Determining the Instantaneous Validity Rate

While the validity trend $\lambda_i$ indicates a long-term change rate of the pre-computed search result i, the instantaneous validity rate $\hat{\lambda}_i$ indicates a recent validity rate. In contrast to the validity trend $\lambda_i$ being determined on the basis of a more extensive history data (including at least three past re-computations of the pre-computed search result i, but generally a significantly higher number of re-computations such as 100, 200, 500, or 1000 or more re-computations), the instantaneous validity rate $\hat{\lambda}_i$ is calculated by taking into account exactly two re-computations only.

As explained above with reference to FIG. 4, re-computation of an individual pre-computed search result i yields a binary results in terms of whether or not the pre-computed search result has been valid at the time of the re-computation: pre-computed search result i has either been valid (flag $b_i$ is, e.g., set to 1) or the pre-computed search result is found to be invalid and the re-computed value of i differs from the previous value of i before the re-computation (and the flag $b_i$ is, e.g., set to 0).

Thus, in order to determine a meaningful value for the instantaneous validity rate $\hat{\lambda}_i$ of the pre-computed search result i, the re-computations of a further number of pre-computed search results being related to the pre-computed search result i is taken into account. The term "related" here again refers to a correlation between the pre-computed search results in terms of their validity probability characteristics, as described above in the course of introducing the concept of shares (FIG. 3). Thus, the instantaneous validity rate $\hat{\lambda}_i$ of the pre-computed search result i is generally determined at the level of the share in which the pre-computed search result i is included. For example, all pre-computed search results in a particular share D are considered to be related to each other. If, for example, all pre-computed search results in a particular share D are re-computed together, the two last re-computations of all these pre-computed search results (referred to as the "current" and the "previous" re-computation) are taken into account and a common value for the instantaneous validity rate $\hat{\lambda}_i$ for all these pre-computed search results in the share D is determined. In another example, only a (representative, e.g., uniformly distributed) sub-portion of the pre-computed search results in the share D are considered for determining the instantaneous validity rate $\hat{\lambda}_i$, even if all pre-computed search results in the share D are re-computed during the current re-computation. In another example, only a part of the pre-computed search results in the share D are re-computed by the current re-computation and either all or a sub-portion of this part of pre-computed search results is considered for determining the instantaneous validity rate Li. In a further example, only a part of the pre-computed search results in the share D are re-computed by the current re-computation, but also other pre-computed search results not having been re-computed by the current re-computation, but only by an earlier re-computation are taken into account for determining the instantaneous validity rate $\hat{\lambda}_i$. Generally, the two last re-computations of any pre-computed search result related to pre-computed search result i can be taken into account for determining the instantaneous validity rate $\hat{\lambda}_i$, irrespective at which point of time the two last re-computations of the related pre-computed search results have been occurred.

The number of pre-computed search results considered for determining the instantaneous validity rate $\hat{\lambda}_i$ depends on the number of pre-computed search results in the share D in which the pre-computed search result i is included. The number of related pre-computed search results considered for determining the instantaneous validity rate $\hat{\lambda}_i$ may, for example, be in the range of 10, 50, 100, 1000, 10000, 50000, or 100000 or more pre-computed search results. The higher the number of pre-computed search results considered for determining the instantaneous validity rate $\hat{\lambda}_i$, the higher the statistical significance of the instantaneous validity rate $\hat{\lambda}_i$ is. Thus, re-computation controller 2 may employ a minimum threshold for the number of pre-computed search results to be taken into account for determining the instantaneous validity rate $\hat{\lambda}_i$.

Similarly, as it has been illustrated above with reference to FIG. 4, successive re-computation intervals of an individual pre-computed search results are generally not equidistant. The same is generally also true for the last re-computation interval (i.e., the time period between the two last re-computations) of a plurality of related pre-computed search results which are considered for determining the instantaneous validity rate $\hat{\lambda}_i$. This is shown by the examples of FIGS. 5A and 5B.

Figure 5A:
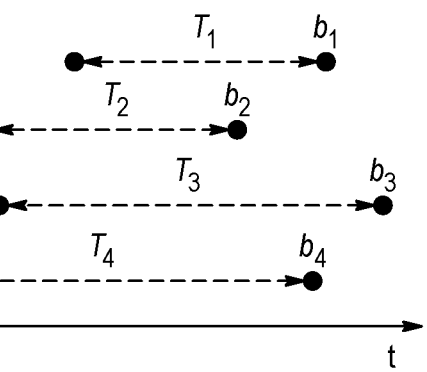
FIGS. 5A and 5B visualize inequidistant time intervals between two re-computations of a plurality of related pre-computed search results.
Figure 5B:
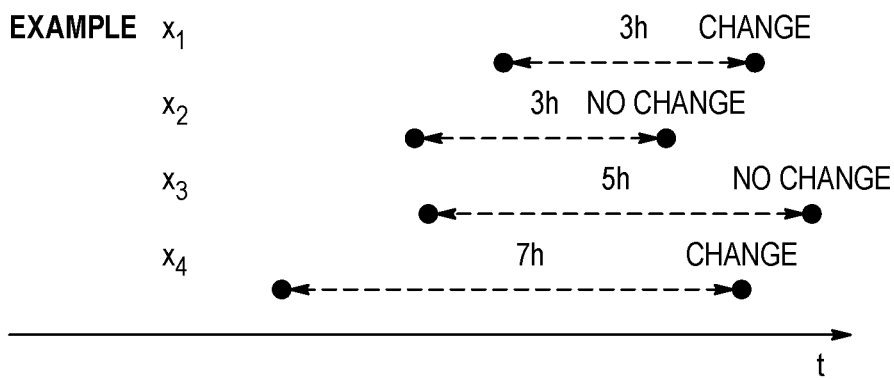

FIG. 5A shows an example with four pre-computed search results, numbered 1 to 4 (the number of shown pre-computed search results is small for reasons of illustration). Each of these pre-computed search results is re-computed in accordance with the re-computation strategy employed at different points of time. This also leads to different lengths of the re-computation intervals between the first re-computation and the second re-computation shown by FIG. 5A. For example, the re-computation interval of the pre-computed search results 1 and 2 is three hours (although the points of re-computations of pre-computed search result 1 and 2 differ from each other) as the re-computation strategy prescribed that a further re-computation was already necessary after three hours. The re-computation interval of pre-computed search result 3 is five hours, that of pre-computed search result 4 is seven hours. FIG. 5B again depicts a formal designation of the re-computations with Ti denoting the duration of the latest re-computation interval of pre-computed search result i and $b_i$ being the flag indicating whether or not the respective pre-computed search result i has been found to be valid at the second re-computation.

Due to the generally differing, inequidistant last re-computation intervals, the determining of the instantaneous validity rate $\hat{\lambda}_i$ faces similar issues as the determination of the validity trend as described above because it is generally uncertain at which exact point of time within the last re-computation interval the respective pre-computed search result has become invalid. For these reasons, the same mechanisms as described above with respect to the determination of the validity trend may also be employed for determining the instantaneous validity rate $\hat{\lambda}_i$ (such as the maximum likelihood estimation and the establishment of the empirical distribution function). Similar to what has been described above for determining, also the determination of the instantaneous validity rate $\hat{\lambda}_i$ may utilize MapReduce processes. In order to avoid repetitions, it is referred to the respective explanations above and to the more specific examples given below.

Optionally, the determination of the instantaneous validity rate $\hat{\lambda}_i$ for the pre-computed search result i is performed in response to a re-computation of the pre-computed search result i. More specifically, the determination of the instantaneous validity rate $\hat{\lambda}_i$ for the pre-computed search result i is performed in response to a re-computation of the pre-computed search result i which was initiated by the usual re-computation strategy employed, i.e., the re-computation controller 2 determined that a re-computation of the pre-computed search result i was necessary in view of the validity probability associated with i. In this way, artificial re-computations such as the above-mentioned sampling process is unnecessary and re-computation resources are utilized in an efficient manner.

However, as explained before, the determination of the instantaneous validity rate $\hat{\lambda}_i$ for the pre-computed search result i may also consider the last two re-computations of other pre-computed search results related to i although these other pre-computed search results were not re-computed during the current re-computation, but their latest re-computation took place at an earlier point of time. Referring again to FIGS. 5A and 5B, the pre-computed search result 3 is re-computed by the current re-computation and the instantaneous validity rate $\hat{\lambda}_3$ for the pre-computed search result 3 is determined accordingly based on the value of $b_3$. To this end, also the two last re-computations of the pre-computed search results 1, 2 and 4 and the corresponding values of $b_1$, $b_2$ and $b_4$ are considered for the determination of $\hat{\lambda}_3$, given that the pre-computed search results 1, 2 and 4 are related to the pre-computed search result 3. As depicted by FIG. 5A, latest re-computation of the pre-computed search results 1, 2 and 4 occurred at an earlier point of time than the current re-computation of pre-computed search result 3. On the other hand, the purpose of the instantaneous validity rate $\hat{\lambda}_i$ is to indicate a recent, more up-to-date snapshot-like validity rate, it may be desirable to include only related pre-computed search results into the determination of the instantaneous validity rate $\hat{\lambda}_i$ which experienced their latest re-computation within a certain past time frame. To this end, the re-computation controller 2 optionally maintains a re-computation time threshold prescribing a maximum amount of time passed since the latest re-computation. In such embodiments, only pre-computed search results related to the pre-computed search result i are taken into account for the determination of the instantaneous validity rate $\hat{\lambda}_i$ which had the latest re-computation within the re-computation time threshold.

Optionally, the minimum number threshold and the re-computation time threshold may be employed in combination.

Comparison of Validity Trend and Instantaneous Validity Rate and Adjusting the Validity Probabilities of Pre-Computed Search Results in the Second Share After having determined the values of the validity trend $\lambda_i$ and instantaneous validity rate $\hat{\lambda}_i$, the re-computation controller 2 performs a comparison between both parameters. The comparison may, for example, be an actual comparison of both values, but may also include a certain (hypothetical) age of the pre-computed search result. In other words, the comparison may also be performed as a comparison of validity probabilities at a certain time after re-computation (such as the validity probability at 10 hours after re-computation), a validity probability based on the determined value of the validity trend $\lambda_i$ and validity probability based on the determined value instantaneous validity rate $\hat{\lambda}_i$. Both approaches are equivalent from a mathematical point of view.

The comparison yields a difference between validity trend $\lambda_i$ and instantaneous validity rate $\hat{\lambda}_i$ or between validity probability based on the determined value of the validity trend $\lambda_i$ and validity probability based on the determined value instantaneous validity rate $\hat{\lambda}_i$, respectively. The determined difference is then compared with a given difference threshold (such as 10% validity probability difference). If the difference exceeds the threshold, it is assumed that an event detrimental to the validity of the pre-computed search result i has been occurred which is not reflected in the probabilistic model. In this case, the re-computation controller proceeds with adjusting validity probabilities associated with other pre-computed search results correlated to the pre-computed search result i because the validity of these other pre-computed search results may also be negatively affected by the detected event.

Generally, the correlation considered for the adjustment of the validity probabilities of the other pre-computed search results is located on the level of shares. As described above with reference to FIG. 3, different levels of correlations exist between shares. For example, the share D being the share of the pre-computed search result i may be strongly correlated to share D'. The correlation between share D and share F may be at medium level. And only a minor correlation may exist between D and the other shares depicted in FIG. 3. A correlation threshold may be employed to decide whether two shares are correlated to each other. If the correlation between shares exceeds the threshold, these two shares are considered to be correlated to each other.

Since the detected difference between validity trend $\lambda_i$ and instantaneous validity rate $\hat{\lambda}_i$ means that the recent validity of the pre-computed search result i is lower than the long-term validity probability given by the probabilistic model and this, in turn, implies that the current validity of other pre-computed search results in the correlated second share D' are likely to be below the long-term validity probability, the validity probabilities of the other pre-computed search results in the second share D' are to be decreased. In some embodiments, the amount of decrease of the validity probabilities of the other pre-computed search results in the second share D' depends on the amount of the difference detected between validity trend $\lambda_i$ and instantaneous validity rate $\hat{\lambda}_i$, i.e., the greater the difference between validity trend $\lambda_i$ and instantaneous validity rate $\hat{\lambda}_i$ is, the more is the decrease of the validity probabilities of the other pre-computed search results in the second share D'.

In some embodiments, the degree of correlation between two shares D and D' is determined by using a linear regression to model a relation between a difference between a share-level validity trend $\lambda_D$ and a share-level instantaneous validity rate $\hat{\lambda}_D$, $\lambda_D$ indicating a change rate of the probability of the pre-computed search results in the first share D (for example, the average validity trends of all pre-computed search results in D), $\hat{\lambda}_D$ being an instantaneous validity rate relating to the pre-computed search results in the first share D (for example, an instantaneous validity rate determined on the basis of the two last re-computations of all pre-computed search results in D), and a difference between a share-level validity trend $\lambda_{D'}$ and a share-level instantaneous validity rate $\hat{\lambda}_{D'}$, $\lambda_{D'}$ indicating a change rate of the validity probability of the pre-computed search results in the second share D' (for example, the average validity trends of all pre-computed search results in D'), $\hat{\lambda}_{D'}$ being an instantaneous validity rate relating to the pre-computed search results in the second share D' (for example, an instantaneous validity rate determined on the basis of the two last re-computations of all pre-computed search results in D').

More specifically, the correlation between the two exemplary shares D and D' is determined by employing the variance of the past values of the instantaneous validity rate over time and the covariance between instantaneous validity rate $\hat{\lambda}_D$ and the instantaneous validity rate $\hat{\lambda}_{D'}$. These two statistical indicators can be defined as follows:

$$\sigma_D^2 = \text{variance}(\hat{\lambda}_D)$$

$$\sigma_{DD'} = \text{covariance}(\hat{\lambda}_D, \hat{\lambda}_{D'})$$

If covariance $\sigma_{DD'}$ between the two share-level instantaneous validity rates $\hat{\lambda}_D$ and $\hat{\lambda}_{D'}$ exceeds a given threshold $$\left( \text{such as } \frac{\sigma_{DD'}}{\sigma_D \sigma_{D'}} > 0.5, \right)$$

a difference between the share-level validity trend $\lambda_D$ and the share-level instantaneous validity rate $\hat{\lambda}_D$ likely means that a similar difference exists for the share D' between the share-level validity trend $\lambda_{D'}$ and a share-level instantaneous validity rate $\hat{\lambda}_{D'}$.

In some embodiments, the validity trends associated with the other pre-computed search results included in the second share D' are adjusted in dependency of the degree of correlation between the first share D and the second share D'. To this end, the degree of correlation between each two shares D and D' maintained by the search platform 4 is determined, for example based on the covariance between instantaneous validity rate $\hat{\lambda}_D$ and the instantaneous validity rate $\hat{\lambda}_{D'}$ as described above.

In some embodiments, the amount of decrease of the validity probabilities of the pre-computed search results in the second share D' is proportional to the degree of correlation between the first share D and the second share D'.

In other embodiments, the amount of decrease of the validity probabilities of the pre-computed search results in the second share D' depends on both, the amount of difference detected between validity trend $\lambda_D$ and instantaneous validity rate $\hat{\lambda}_D$ in the first share D and the degree of correlation between the first share D and the second share D'. By using linear regression, the correlation between the two shares D and D' regarding the difference between the validity trend values and instantaneous validity rate of their pre-computed search results can be modeled by the following relation:

$$\hat{\lambda}_{D'} - \lambda_{D'} \approx \frac{\sigma_{DD'}}{\sigma_D^2}(\hat{\lambda}_D - \lambda_D)$$

By introducing a residual value s, this relation can be re-drafted to the following formula:

$$\hat{\lambda}_{D'} - \lambda_{D'} = \frac{\sigma_{DD'}}{\sigma_D^2}(\hat{\lambda}_D - \lambda_D) + \varepsilon_{DD'}$$

The residual parameter $\varepsilon_{DD'}$ induced by this regression can be modeled, for example, by establishing that $\varepsilon_{DD'}$ is under a given value $\varepsilon_{99\%}$ at 99% of the time). If modeled difference between the share-level validity trend D', and the share-level instantaneous validity rate $\hat{\lambda}_{D'}$ (the term on the left of the equation) is lower than a relatively frequent residual value (like $\varepsilon_{99\%}$), the amount of the difference $\hat{\lambda}_D - \lambda_D$ and the correlation between the two shares D and D' are considered to be insignificant and no adjustment of the validity probabilities of the pre-computed search results in the second share D' is performed. Otherwise, the validity probabilities of the pre-computed search results in the second share D' are adjusted in accordance with the determined difference $\hat{\lambda}_D - \lambda_D$ and the correlation between the two shares D and D'. The re-computation controller 2 may apply the latter formula to any second share D' maintained by the search platform 4.

The adjustment (i.e., the decrease) of the validity probabilities may be performed in various ways. In some embodiments, the validity trend values $\lambda_i$ of the pre-computed search results in the second share D' (and the validity trend $\lambda_{D'}$, respectively) are decreased. In other embodiments, the age of the pre-computed search results in the second share D' (i.e., the time since the last re-computation) is artificially increased, i.e., the age $t_{D'}$ of D' is adapted to $t_{D'}^{new}$ that the validity probability function of D' given by the instantaneous validity rate is reflected in the adjusted validity probability function based on the validity trend, i.e., $e^{-\hat{\lambda}_{D'} t_{D'}} = e^{-\lambda_{D'} t_{D'}^{new}}$. The adapted age value is then given by $t_{D'}^{new} = \hat{\lambda}_{D'} t_{D'} / \lambda_{D'}$.

In other embodiments, the validity probability values (derived from at least the validity trend values and the age) are decreased by an absolute or relative value.

An example of the comparison of the validity trend $\lambda_D$ and the instantaneous validity rate $\hat{\lambda}_D$, correlated shares and the validity probability decrease of other correlated shares is given further below with reference to FIGS. 10 and 11.

Triggering the Re-Computation

Finally, the re-computation controller 2 generates and issues re-computation orders to the computation platform 3 to re-compute a part of the pre-computed search results on the basis of the validity probabilities associated with the pre-computed search results.

The present approach to recognize potentially invalid pre-computed search and consider this recognition in the re-computation strategy has now been described on a more general, functional level. The resulting process performed by the re-computation controller 2 is visualized by FIG. 6. At 12, the re-computation controller 2 determines the validity trend $\lambda_i$ for the pre-computed search result i. Next, at 13, the re-computation controller determines the instantaneous validity rate $\hat{\lambda}_i$ indicating the recent validity rate of the pre-computed search result i. Subsequently, at 14, the re-computation controller 2 compares the validity trend $\lambda_i$ with the instantaneous validity rate $\hat{\lambda}_i$. If the instantaneous validity rate $\hat{\lambda}_i$ is substantially greater than validity trend $\lambda_i$, i.e., the difference between both exceeds a given threshold (indicated by ">>" in FIG. 6), the process proceeds to activity 15 at which the re-computation controller 2 adapts the validity probabilities of pre-computed search results being correlated to the pre-computed search result i. More specifically, the validity probabilities for pre-computed search results included in shares D' which are correlated to the share D of the pre-computed search result i are adapted. The adaptation takes into account the extent of the difference between the validity trend $\lambda_i$ and the instantaneous validity rate $\hat{\lambda}_i$ determined at 14. In addition, the adaptation of 15 may take into account the degree of correlation between the pre-computed search result i (or the share D in which i is included) and the other pre-computed search results whose validity probabilities are to be adapted (or the share(s) D' in which these other pre-computed search results are included).

Next, at 16, the re-computation controller initiates re-computation of the pre-computed search results based on the validity probabilities associated with the pre-computed search results dependent on the re-computation strategy employed. For example, re-computation orders are generated with respect to pre-computed search results that have a lower validity probability than other pre-computed search results that have a higher validity probability. This may, for example, be implemented by using threshold values of the validity probabilities. Pre-computed search results with a validity probability below such threshold value need to be re-computed. Accordingly, respective re-computation orders are generated by the re-computation controller and sent out. Pre-computed search results with a validity probability of above such threshold value are considered as likely being still valid and consequently do not need to be re-computed. Accordingly, no re-computation orders are issued with respect to these pre-computed search results. Also more sophisticated re-computation strategies may be employed, e.g., as described by European Application No. 14290040.6.

Referring back to FIG. 6, if activity 14 has shown that the instantaneous validity rate $\lambda_i$ is not substantially lower than validity trend $\lambda_i$, i.e., the given difference threshold was not exceeded, activity 15 was not performed. In this case, the re-computation controller 2 initiates re-computation at 16 with original, not adapted values of the validity probabilities. If activity 15 was performed, the re-computation controller 2 initiates the re-computation based on these validity probabilities which have been adapted at activity 15. The adaption of the validity probabilities performed at 15 may cause re-computation of these pre-computed search results whose validity probabilities were adapted (or a portion of these pre-computed search results with adapted validity probabilities) because the re-computation strategy may prescribe that pre-computed search result with the lowest validity probabilities are to be re-computed with priority (of course, the re-computation strategy may also take into account other factors such as the popularity of pre-computed search results). In this way, the determination of potentially invalid pre-computed search results achieved by activities 12 to 15 results in a generally higher validity of the pre-computed search results stored by the search platform 4.

Figure 6:
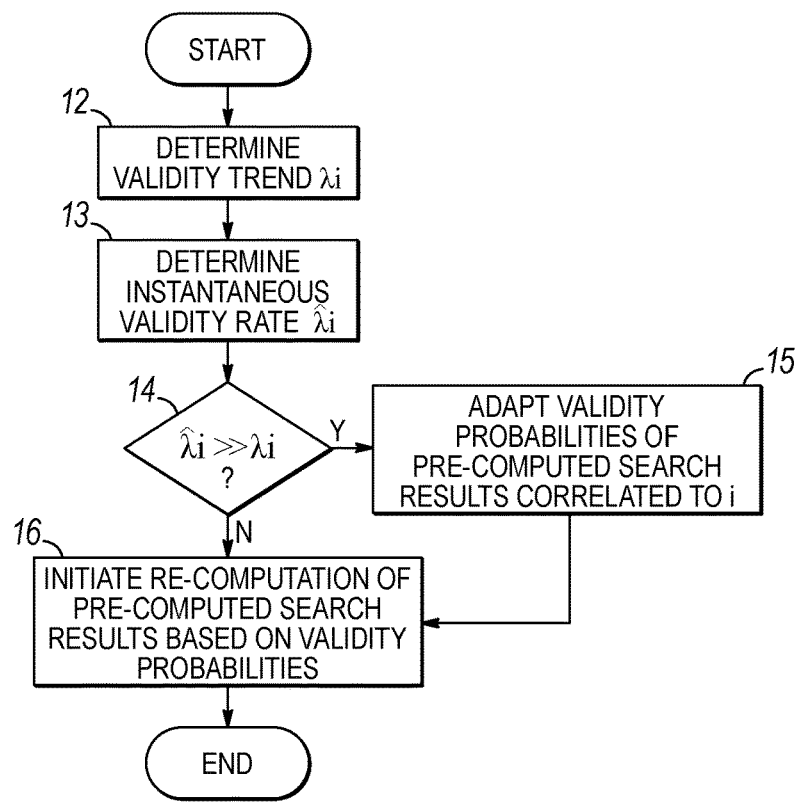
FIG. 6 is a flow chart depicting the process of detecting an event detrimental to the validity of pre-computed search results at a high level.

In response to receiving the re-computed search results which are computed by the computation platform 3 in response to activity 16, the re-computation controller 2 may enter the next cycle (as indicated in FIG. 6 by arrows 8 and 9) starting either with determining the validity trend values $\lambda_i$ of the re-computed results i or, if activity 12 is skipped for the re-computed search results i (as the validity trend values $\lambda_i$ have been already determined at an earlier point of time and an update is considered to be unnecessary), with determining the instantaneous validity rate values $\hat{\lambda}_i$ of the re-computed search results i.

Although the process of FIG. 6 has been described as a sequential process of activities 12 to 16, these activities do not have to be performed in a strictly sequential way in practice. Rather, for example activities 12 and 13 may be executed by different control modules which estimate and update the validity trend and instantaneous validity rate values for all pre-computed search results periodically and in parallel (cf. also the example of FIG. 12 described further below). Hence, for example, activities 13, 14 and 15 may be performed by a control module in the order shown by FIG. 6, but activities 12 and 16 may be conducted by other control modules in parallel and independent from activities 13 to 15.

Estimating the Empirical Distribution Function

Now turning to the more specific description of particular examples implementing the more general functions described above, FIGS. 7 to 9 relate to a particular implementation example for determining the validity trend $\lambda_i$ and/or the instantaneous validity rate $\hat{\lambda}_i$, namely the derivation of the empirical cumulative distribution function of the pre-computed search result i, denoted as $F_i(t)$ specifying the probability that the pre-computed search result i does not become invalid within time t. Note that the following description again applies to any pre-computed search result i and, alternatively, also to sets of pre-computed search results (for example, to complete shares of pre-computed search results or portion of shares).

Figure 7:
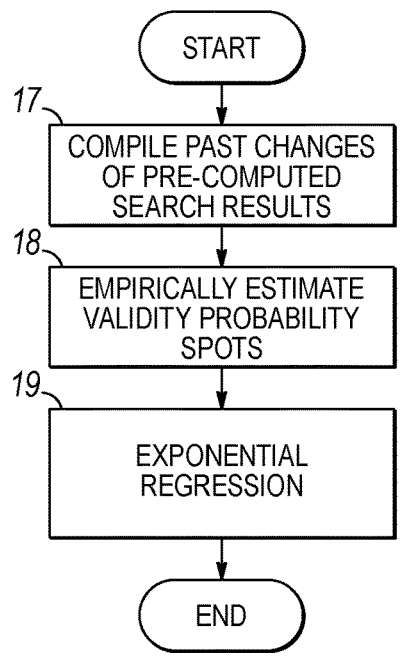
FIG. 7 is a flow chart depicting an approach to determine a validity trend and/or an instantaneous validity rate by establishing an empirical distribution function.

Introducing, FIG. 7 first gives a general process flow overview. Generally, the empirical distribution function is derived from statistics of previous re-computations of the pre-computed search result i. Hence, as a first activity, past changes of the pre-computed search result i are compiled at 17. The basis for this compilation of past changes is, for example, the control data maintained by the re-computation controller as described above with reference to FIG. 4 (i.e., the set of tuples of specifying the series of past re-computations of the pre-computed search result i). In addition or as an alternative, the search platform 4 and/or the re-computation controller 2 (or another entity such as a history database) may maintain historical versions of the pre-computed search result i, e.g., the past values of the pre-computed search result i and associated time stamps indicating at which time or time interval the respective historic value of i was stored in the search platform 4. The goal of activity 17 is to obtain a data structure of the historic development of the pre-computed search i.

Figure 8A:
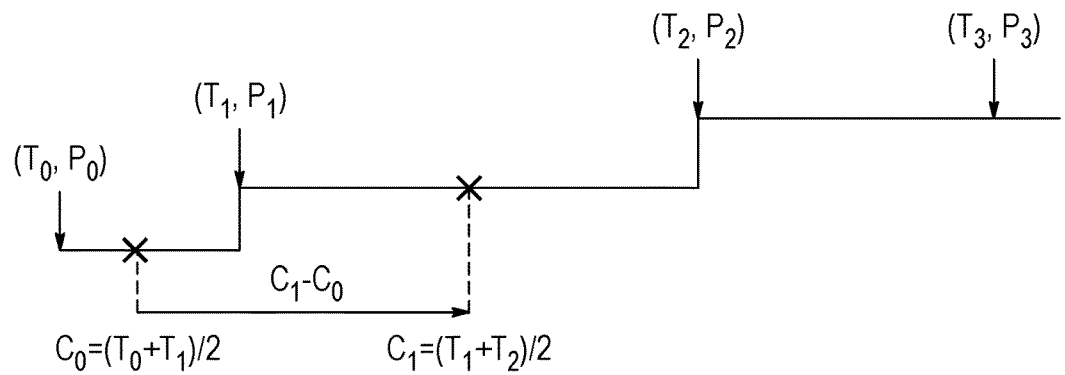
FIGS. 8A and 8B visualize establishing an empirical distribution function by using stability periods spanning a re-computation of a pre-computed search result and a window sliding over a stability period.
Figure 8B:
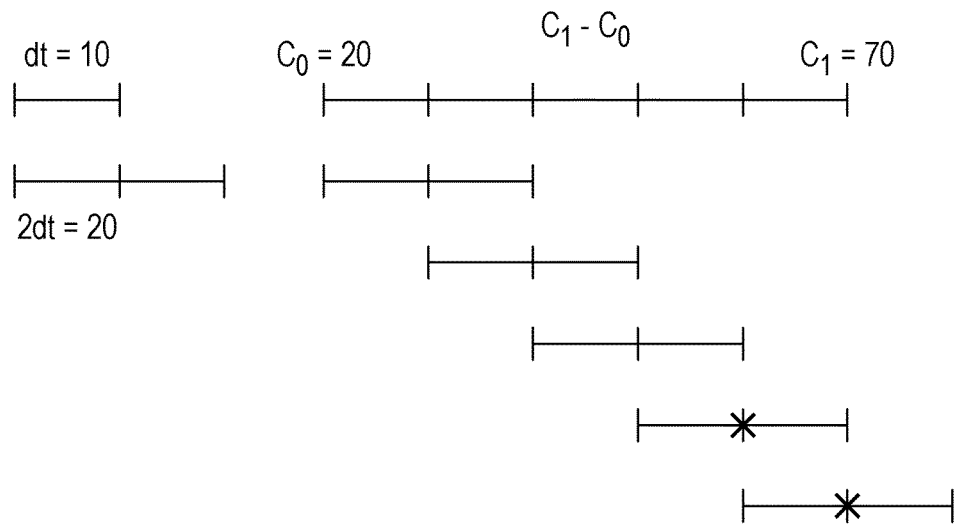

The second activity 18 is to empirically estimate discrete values for the validity probability at particular points of time after a re-computation of the pre-computed search result i. This is, for example, achieved by defining time intervals spanning a re-computation point of time in which it is assumed that the pre-computed search result was valid. These time intervals are hereinafter referred to as "stability periods". For example, a stability period spanning the $n^{th}$ re-computation is defined as the time period beginning at the middle of the time interval between the $n-1^{th}$ re-computation and the $n^{th}$ re-computation and ending at the middle of the time interval between the $n^{th}$ re-computation and the $n+1^{th}$ re-computation (this assumes that the respective pre-computed search results have become invalid in the middle between two subsequent re-computations). This example is visualized by FIG. 8b showing four re-computations of the pre-computed search result i at the times $T_0$, $T_1$, $T_2$ and $T_3$. Re-computation at $T_0$ resulted in the value $P_0$ for the pre-computed search result i. Re-computations at $T_1$ and $T_2$ resulted in the values $P_1$ and $P_2$, respectively, for the pre-computed search result i. Finally, value $P_3$ of pre-computed search result i was the result of the re-computation at time $T_3$ (the increasing step function shown by FIG. 8a indicates that the value of the pre-computed search result i has increased until $T_2$, i.e., $P_0 < P_1 < P_2$, but $P_3 = P_2$). The half-time points between the times $T_n$ are given by $(T_n + T_n + 1)/2$ and are denoted as $C_n$. Thus, in this example, the stability period spanning the re-computation at time $T_i$ is defined as $C_1 - C_0$, wherein $C_1$ is given by $(T_1 + T_2)/2$ and $C_0$ is given by $(T_0 + T_1)/2$. Hence, as a presumption for the derivation of $F_i(t)$, it is assumed that the pre-computed search result i was valid within the stability period $C_1 - C_0$, but the value $P_0$ was invalidated at $C_0$ and the value $P_1$ was invalidated at $C_1$.

For a set of stability periods being defined over the history re-computations of interest, the probability that the pre-computed search result i is not invalidated within k time units is then defined as $$P(\text{no change}|kdt) = \frac{\sum_{0 \leq x < n} \max\{C_{x+1} - C_x - kdt, 0\}}{C_n - C_0},$$

wherein dt denotes a time base (e.g., minutes or hours, 10 minutes, 0.5 hours or 2 hours, etc.) and k denotes a number of time units according to the time base (e.g., k=3 and the time base being 10 minutes, 3dt=3×10=30 minutes).

The effect of this formula is visualized by FIG. 8B. In this example, a single stability period $C_1 - C_0$ is defined with $C_0 = 20$ minutes and $C_1 = 70$ minutes, i.e., invalidations of the pre-computed search result i are assumed to happen at the time of $C_0 = 20$ minutes and $C_1 = 70$ minutes (not in between this interval). The time base is chosen to be 10 minutes and k=2 (i.e., 2×10 minutes=20 minutes). Thus, kdt forms a time window of 20 minutes. In order to determine whether or not a re-computation at kdt after a (first re-computation) yields a different value of the pre-computed search result i, this time window is then slid over the stability period (indicated by the progressing 2dt windows in FIG. 8b). During the first three positions, the pre-computed search result i remains valid because the pre-computed search result updated at $C_0$ is assumed to only change at $C_1$ (not earlier). However, during the two last two positions of the sliding window, an invalidity of the pre-computed search result i is detected because the 2dt window reaches or overlaps with the next assumed change of the pre-computed search result i at $C_1$. Hence, the probability that the pre-computed search result i is not invalidated within any 20 minutes in the stability period $C_1 - C_0$ is 3/5, as in three of the five sliding window positions an invalidity of i is not detected. Referring back to the above equation, this is given by P(no change|k=2)=(70−20−2*10)/(70−20)=3/5.

The estimation of the discrete validity probability values (activity 17) includes varying the number of time base units k and calculate the validity probability values for any given k (e.g., if the time base is 10 minutes, the sliding window size may be varied starting from 10 minutes, i.e., k=1, up to 48 hours, i.e., k=288).

In other words, the aim of this algorithm is to determine the probability that the two subsequent re-computations of the pre-computed search result i are identical under the assumption that the invalidation point of times of the pre-computed search result i ($C_0, C_1, \ldots$) are known and if the first re-computation of the pre-computed search result i is performed at any time to between $C_0$ and $C_1$ and the second re-computation of the pre-computed search result i occurs sometime later (i.e., kdt later, at ti). For this estimation, various different to possible between $C_0$ and Clare taken and for each of these first re-computation times it is checked whether or not the second re-computation at $t_1$ yields a different pre-computed search result i, i.e., whether there was an invalidation at $C_1$ between $t_0$ and $t_0$+kdt. If, e.g., for 80% of the tested (sliding) times of $T_0$ the second re-computation of the pre-computed search result i at $t_1 = t_0$+kdt yields the same pre-computed search result i, it is considered that the probability of the pre-computed search result i still being valid kdt after its computation is 80%, i.e., P(valid after kdt)=0.8. Then, the same process is performed with varied values of k. This yields the discrete validity probability values such as P(valid after 1 hour)=0.990, P(valid after 2 hours)=0.981, P(valid after 3 hours)= . . . , and so on.

Figure 9A:
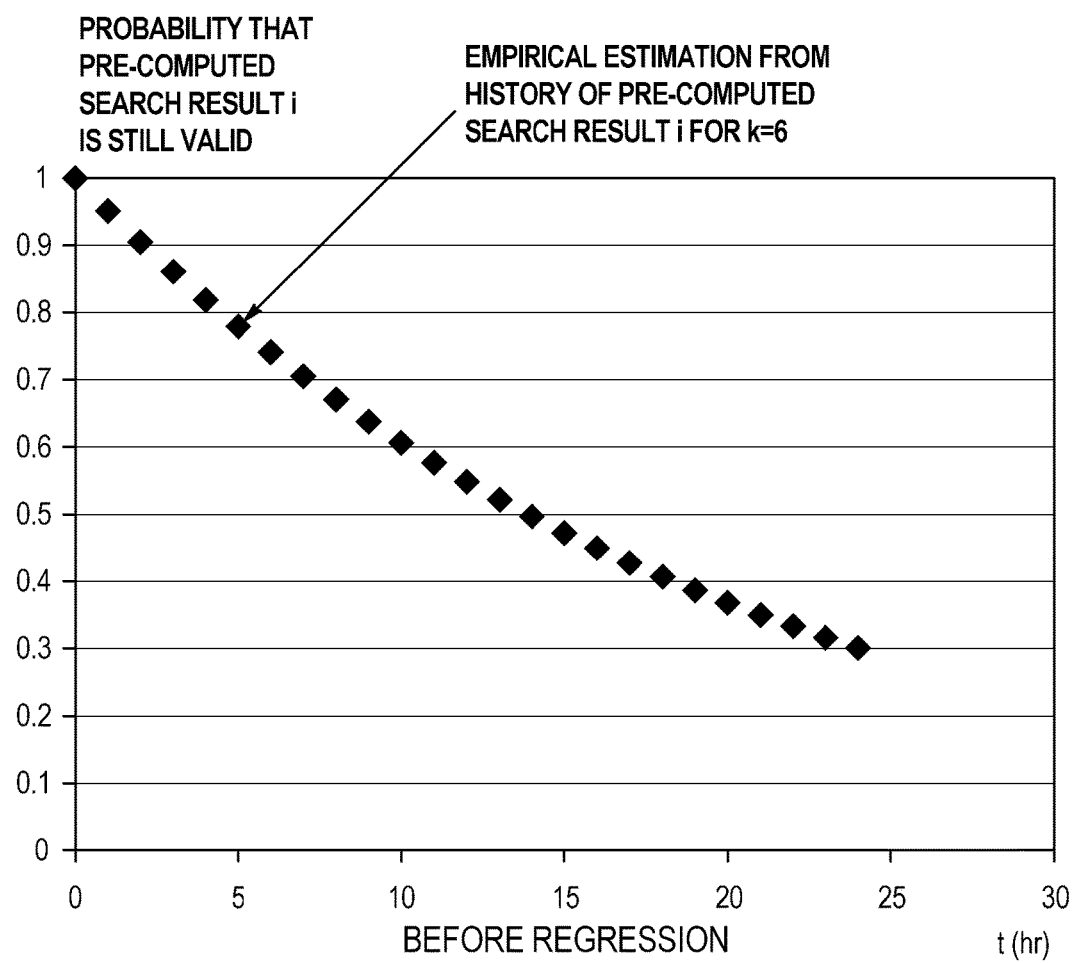
FIGS. 9A and 9B show the resulting discrete validity probability values and obtaining the validity trend/instantaneous validity rate by regression.

Hence, in this way, the result of activity 17 is a series of individual validity probability values at particular points of time as indicated by FIG. 9a.

Figure 9B:
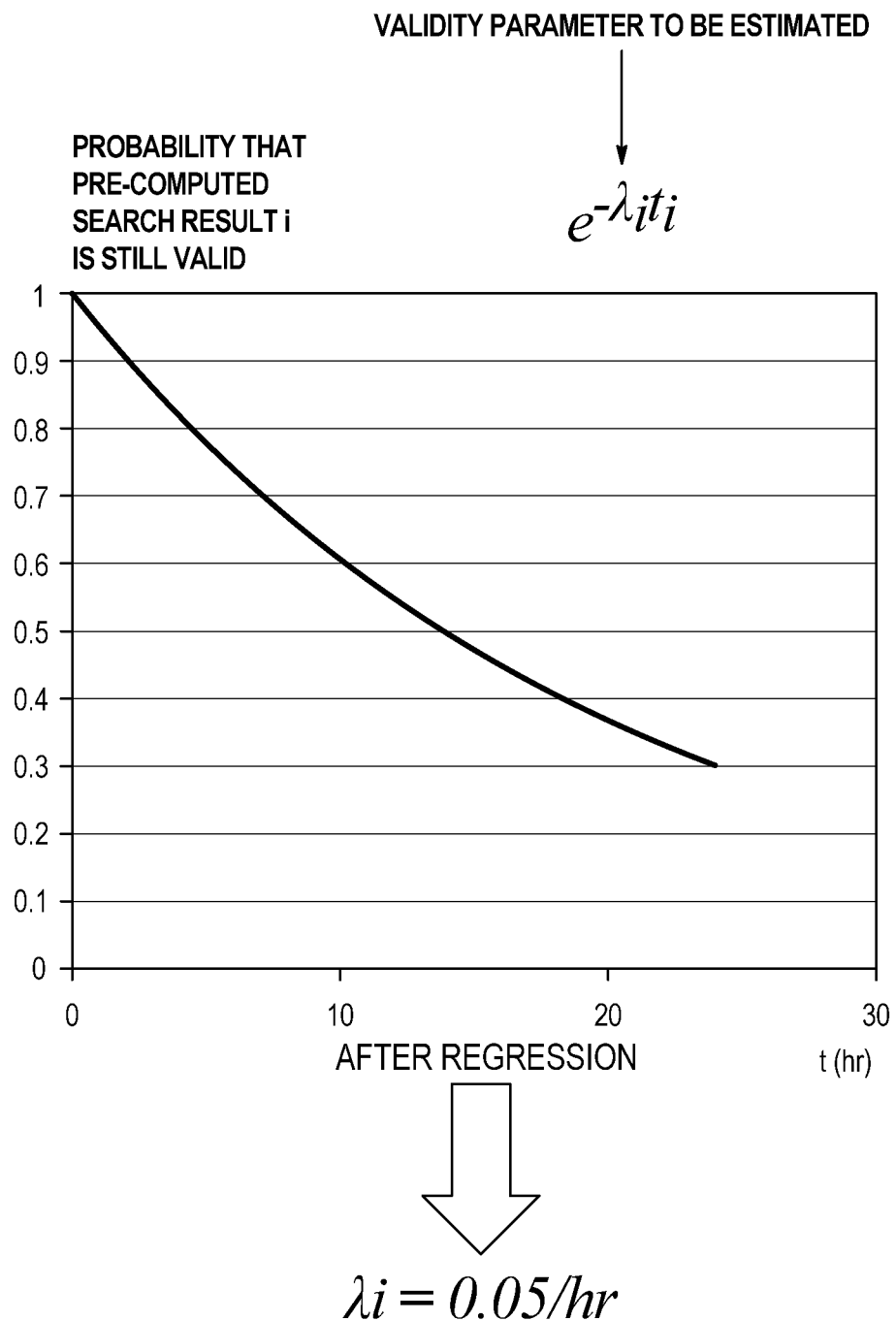

Now referring back to FIG. 7, the last activity 18 of the high-level process of the empirical distribution function estimation is formed by an exponential regression of the individual validity probability values in order to determine the best fit function corresponding to the discrete validity probability values resulting from activity 17. This is realized by commonly known regression methods. The regression results in a value for $\lambda_i$ and $\hat{\lambda}_i$, respectively, as indicated by FIG. 9B.

In the following, a more specific example of determining the validity trend $\lambda_i$ by establishing $F_i(t)$ is described. In this example, the pre-computed search results are travel-related data, more particularly priced travel recommendations. The search platform 4 pre-computes and stores the lowest prices for every offered travel. However, the following example is not specific for such travel-related data, but can also be applied to other types of pre-computed search results.

One characteristics of this example is that the activities 17 and 18 are performed by two sequential MapReduce jobs. The first MapReduce job of the present example relates to activity 17 and performs a price history reconstruction of the priced travel recommendations stored by the search platform 4 and managed by the re-computation controller 2. Each priced travel recommendation stored by the search platform 4 has several data fields such as origin, destination, departure date, return date, ID of the travel office which offers the recommendation, and price. The re-computation controller 2 keeps additional control data associated with the priced travel recommendation such as the time stamp of the last re-computation. In addition, the re-computation controller 2 or, alternatively, another entity accessible by the re-computation controller 2 such as a history database maintains historic versions of the priced travel recommendations including former prices and timestamps of earlier re-computations. The database key used for the price history reconstruction of the historic priced travel recommendations is, for example, the combination of the data fields travel office ID, origin, destination, departure date and return date. The aim of the price history reconstruction is, for each historical version of each travel recommendation, to obtain the cheapest price and the timestamp associated with each re-computation. This is done by the following Map/Reduce procedures:

The Map procedure associates to each key a tuple of re-computation timestamp and price.

The Reduce procedure associates to a key a list of sorted tuples of re-computation timestamp and price.

An exemplary result for an exemplary priced travel recommendation is as follows.

The key is PARAF08AA,NCE,LON, 15/02/2012,20/02/2012, wherein PARAF08AA is the office ID, NCE is the origin (airport code of Nice), LON is the destination (airport code for London metropolitan area), 15/02/2012 is the departure date and 20/02/2012 is the return date. The travel recommendation defined by this key is associated with a list of tuples re-computation timestamp and the price resulting from the re-computation ordered by re-computation timestamps such as (15/01/2012,150), (16/01/2012,160), (17/01/2012, 160), etc., the first string such as 15/01/2012 indicating the re-computation timestamp, the second number such as 150 specifying the price in Euros.

Hence, in this example, three computations are shown on three consecutive days. The cheapest price available for the exemplary travel recommendation was initially 150 Euros and increased by 10 Euros at some point of time between the two first computations.

A second MapReduce job is performed to implement the empirical validity estimation (activity 18), e.g., by employing the sliding window techniques as described in detail above. To this end, for all feasible values of k (e.g., time units between 10 minutes and 48 hours), the number of sliding time window positions out of all possible time window positions is computed that contain a price change. This is done at the key level office ID, origin and destination and, additionally, a time range between re-computation and the departure date (hereinafter referred to as advance range). For example, the key PARAF08AA,NCE,LON,15,30 is used to determine the number of price changes in an advance range between 15 and 30 days, i.e., a time window of 15 to 30 days before the departure date of the travel recommendation.

The motivation for considering advance ranges is to avoid an explosion of number of keys and to increase the statistical significance of the price change information aggregated at key level. In addition, groups of advance ranges may be defined and the determined price changes are aggregated for each advance range group. An exemplary grouping of advance ranges is {[0-3],[4-6],[7-13],[14-20],[21-30],[31-60],[61-90],[91-120],[121-180],[181,270],[271-361]}, i.e., the first group is given by the time window departure date to three days prior to departure date, the second group is given by the time window of four to six days before departure date and so on.

A simplified exemplary result of the second MapReduce job (determination of the discrete validity probability values for varying values of k) is as follows. Total duration of stability periods (i.e., sum of all stability periods from all tuples for all priced travel recommendations fulfilling the key PARAF08AA,NCE,LON, 15,30 is 120 days), and four different sliding time windows are employed by varying k=1, 2, 3, 4. For each value of k, it is computed:

$$\Sigma_{0 \le i < n} \max\{C_{i+1} - C_i - kdt, 0\}$$

This yields the following validity probabilities for k=1: 110/120 (i.e., in 110 of the possible sliding window positions have yielded that the price of the priced travel recommendation is not changed at the second re-computation, i.e., the price was stable for k time unit in 110 out of 120 cases), for k=2:95/120, for k=3:72/120 and for k=4:60/120.

Maximum Likelihood Estimation

Alternative to the implementation example of determining the validity trend $\lambda_i$ and/or the instantaneous validity rate $\hat{\lambda}_i$ by establishing the empirical distribution function, the mechanism of the maximum likelihood estimation may be employed to determine the validity trend and/or the instantaneous validity rate. Again, the following description applies to any pre-computed search result i and, alternatively, also to sets of pre-computed search results (for example to complete shares of pre-computed search results or portion of shares). The notation of re-computation time $T_n$ and flags $b_n$ for indicating whether or not the pre-computed search result i was invalid at the time of the re-computation as introduced above are used here as well.

The maximum-likelihood estimation is a method of estimating the parameters of a probabilistic model. When applied to a data set and given a probabilistic model, the maximum-likelihood estimation provides estimates for the model's parameters. In general, the maximum likelihood estimation selects the set of values of the model parameters that maximizes the likelihood function. Hence, this approach maximizes the correspondence of the selected probabilistic model with the observed data.

For the present issue of determining the validity trend $\lambda_i$ and/or the instantaneous validity rate $\hat{\lambda}_i$, the maximum likelihood estimation can be applied as follows: The estimation is based on a sample of historic re-computations of the pre-computed search result i (or a set of pre-computed search results such as share D) which is the observed data. The underlying probabilistic model is defined in that for a pre-computed search result i having a validity trend $\lambda$, the probability of $b_n=1$ (i.e., i is still valid) after the time $T_n$ is, $e^{-\lambda_i T_n}$, and the probability of $b_n=0$ (i.e., i is not valid) is $1 - e^{-\lambda_i T_n}$. Thus, $b_n$ follows a classic Bernoulli law:

$$b_n \sim Be(e^{-\lambda T_n})$$

A historic sample of re-computations of the pre-computed search result i can be defined as $b=(b_1, b_2, b_3, \ldots, b_n)$. The likelihood function L of this sample is the probability that this sample actually occurs for a given parameter $\lambda_i$:

$$L(\lambda i) = P(b \mid \lambda i) = \prod_{\substack{b_n=1 \\ (i.e., \text{unchanged})}} e^{-\lambda i T_n} \prod_{\substack{b_n=0 \\ (i.e., \text{changed})}} (1 - e^{-\lambda i T_n})$$

If a common the validity trend $\lambda_i$ and/or the instantaneous validity rate $\hat{\lambda}_i$ for several pre-computed search results (e.g., all pre-computed search results within a share D) is to be estimated all re-computation history data ($T_n$, $b_n$) for these multiple pre-computed search results are merged and input into this formula.

The parameter $\lambda_i$ is then estimated by determining a maximum value of this likelihood function L, i.e., determining the value of $\lambda_i$ which results in the highest likelihood. The maximum value of the likelihood function is determined in accordance with the following equation (in this example, the first derivative of the log of the previous equation set to zero):

$$-\sum_{b_n=1} T_n + \sum_{b_n=0} T_n \frac{e^{-\lambda i T_n}}{1 - e^{-\lambda i T_n}} = 0$$

This equation is resolved to $\lambda_i$ numerically.

In addition, optionally, a confidence factor is used to assess the potential deviation of the $\lambda_i$ estimated by the maximum likelihood method from the true value of $\lambda$, (for reasons of clarity, the estimated value of $\lambda_i$ is denoted as $\overline{\lambda}$ in the following). This is, for example, realized by evaluating the probability that the true value of $\lambda_i$ is located in the confidence interval $[\bar{\lambda}-\delta, \bar{\lambda}+\delta]$. To this end, for example, the observed Fisher information $\bar{I}_F$ is utilized which is, applied to the present situation, defined as $$\bar{I}_F = \sum_{b_n=0} T_n^2 \frac{e^{-\bar{\lambda}T_n}}{(1-e^{-\bar{\lambda}T_n})^2}$$

With an increasing size of the sample, the true value of $\lambda$, given by the observed sample $b,\lambda_i|b$, converges to a normal distribution with expected value $\bar{\lambda}_i$ and variance $\sigma^2 = 1/\bar{I}_F$, i.e., $$\lambda_i|b \to \mathcal{N}\left(\hat{\lambda}, \frac{1}{\bar{I}_F}\right)$$

This means that, given the observed sample, the probability of having the true parameter $\lambda_i$ in the interval $[\bar{\lambda}-\delta, \bar{\lambda}+\delta]$ can be evaluated by:

$$P(\bar{\lambda}-\delta < \lambda_i < \bar{\lambda}+\delta) = P\left(\frac{-\delta}{\sigma} < \frac{\lambda_i - \bar{\lambda}}{\sigma} < \frac{\delta}{\sigma}\right) \approx 2\Phi\left(\frac{\delta}{\sigma}\right) - 1$$

wherein $\Phi$ is the cumulative Gaussian distribution function.

As a result, this yields a confidence factor of the maximum likelihood estimation which is:

$$\bar{I}_F = \sum_{b_n=0} T_n^2 \frac{e^{-T_n}}{(1-e^{-\bar{\lambda}T_n})^2}$$

This confidence factor can be used to evaluate the probability of $\bar{\lambda}_i$ being outside the interval given by $\delta$:

$$P(\lambda_i \text{ is outside the } \delta\text{interval}) \approx 2(1-\Phi(\delta\sqrt{\bar{I}_F}))$$

A particular application of this confidence factor is, for example, to evaluate the adequate sample size to get a confident estimation by the maximum likelihood estimation. Thus, for example, in some embodiments, the sample size is progressively increased until the probability to make a 20% error (i.e., $\delta=0.2\bar{\lambda}$) is below 10%.

FIG. 10 shows an example of pre-computed search results stored by the search platform 4 and respective exemplary values for the validity probabilities based on the long-term validity trend $\lambda$ according to the probabilistic model (in FIG. 10 denoted as "Model") and the validity probability given by the instantaneous validity rate $\hat{\lambda}_i$ (in FIG. 10 referred to as "Instant"). Without limitation, the example of FIG. 10 again relates to pre-computed search results being travel-related data, namely priced travel recommendations indicating start and origin, departure and return date, the pre-computed price and other relevant travel information such as booking class etc. In the example of FIG. 10, the priced travel recommendations are grouped into shares of the key origin—destination—month of departure date, the shares shown in form of a matrix (columns designated with a capital letter, rows with a number, i.e., for example the priced travel recommendations with origin=Paris, destination=New York, departure month=August are grouped into share B1). For reasons of simplicity, only a limited number of shares are shown. In reality, generally, a significant higher number of shares may be present.

FIG. 10 illustrates a situation in which the validity trend $\lambda$ and the instantaneous validity rate $\hat{\lambda}$ have been determined for a portion of the shares (namely for shares B1, E1, D2, B3 and C3) in accordance with the methodologies set out above. The values for the validity probabilities based on the validity trend $\lambda$ indicated by FIG. 10 are average values for all pre-computed priced travel recommendations in the respective share. Thus, for example, a value of 0.87 has been determined based on the validity trend $\lambda_{B1}$ of share B1, meaning that the average value of the validity probabilities based on the validity trends $\lambda_i$ of all pre-computed priced travel recommendations in share B1 is 0.87, while the individual values of validity probabilities based on the individual values of $\lambda_i$ associated with each of the pre-computed priced travel recommendations in share B1 may be lower or greater. Similarly, the values of the validity probabilities based on the instantaneous validity rate $\hat{\lambda}$ shown by FIG. 10 are average values. The values of validity probabilities of the instantaneous validity rate $\hat{\lambda}$ result from the two latest re-computations of either all pre-computed priced travel recommendations of a share or at least from a given minimum (representative) subset of the pre-computed priced travel recommendations of a share. For example, the value of validity probability based on the instantaneous validity rate $\hat{\lambda}_{B1}$ for the share B1 (0.85) has been recently determined in response to the last re-computation performed by the computation platform 3 which included all pre-computed priced travel recommendations of share B1. If, for example, share B1 includes 1,000 priced travel recommendations, the last re-computation of all the 1,000 pre-computed priced travel recommendations of share B1 will indicate that ca. 850 of the 1,000 priced travel recommendations have been valid at the time of the re-computation (i.e., the re-computation of these 850 priced travel recommendations did not change the value of the price), whereas ca. 150 of the 1,000 priced travel recommendations were invalid (i.e., the re-computation of these 150 priced travel recommendations yielded a different price than these 150 priced travel recommendations had before the re-computation). Of course, more sophisticated approaches to determine the instantaneous validity rate $\hat{\lambda}$ taking into account the generally inequidistant re-computation intervals of the pre-computed search results as described above (the maximum likelihood estimation or the empirical distribution function establishment) may be applied for the actual determination of $\hat{\lambda}$. Hence, at the individual level of each of the pre-computed priced travel recommendations in share B1, the validity probability given by $\hat{\lambda}_i$ has a value of 0.85 as well (note that this does not necessarily imply that these values of $\hat{\lambda}_i$ are actually maintained as control data by the re-computation platform 2, rather, in the example of FIG. 10, it is sufficient that the average share-level value of $\hat{\lambda}$ is stored by the re-computation controller 2). Alternatively, the last re-computation cycle including pre-computed priced travel recommendations of share B1 only affected 500 of the 1,000 pre-computed priced travel recommendations of share B1 and indicated that 425 of these 500 pre-computed priced travel recommendations were still valid and 75 of these 500 pre-computed priced travel recommendations were invalid.

Moreover, different levels of correlation between the various shares of FIG. 10 exist. For example, a strong correlation exists between shares X1 (A1 though F1), X2 and X3, respectively, i.e., between the shares within one row of the matrix of FIG. 10 relating to a particular origin-destination combination. Within these shares of a particular origin-destination combination, a particularly strong correlation exists between adjacent shares of successive months. On the other hand, the shares X1 (all shares in row 1) are still correlated to the shares X2 (all shares in row 2) to a medium extent, e.g., because they both concern travel recommendations with origin in France (row 1: Paris, row 2: Nice). The correlation between shares X1 and X2 is stronger for shares relating to the same month (e.g., between B1 and B2), less strong between shares of successive months (e.g., between B and C2) and still less strong between shares relating to more remote months (such as 1B and 2F). On the other hand, shares X3 (all shares in row 3) are virtually uncorrelated to the other shares X1 and X2, e.g., shares X3 relate to US domestic travels with origin=Boston and destination=Miami, while shares X1 and X2 refer to travels originating in Europe.

In the example of FIG. 10, the values for the validity trend $\lambda$ of the shares B1, E1, B3 and C3 have already determined at an earlier point of time. The values of the instantaneous validity rate $\hat{\lambda}$ of the shares B1, E1, B3 and C3 have also been determined earlier, e.g., at the respective last re-computations of pre-computed priced travel recommendations included in the shares B1, E1, B3 and C3 (more particularly, at the respective last re-computations re-computing either all pre-computed priced travel recommendations in the respective shares or at least a given subset of the pre-computed priced travel recommendations in the respective shares). The very last re-computation cycle triggered by the re-computation controller 2 and executed by the computation platform 3 now related to the pre-computed priced travel recommendations of share D2 (either all of the pre-computed priced travel recommendations of share D2 or a given minimum (representative) subset—of course, the latest re-computation cycle may have also re-computed other pre-computed priced travel recommendations of other shares). In response to the re-computation of the pre-computed priced travel recommendations of share D2, an updated value for the validity trend $\lambda_{D2}$ is determined (activity 12 of FIG. 6—note that the determination of the validity trend $\lambda_{D2}$ can also be skipped here and may have been performed at an earlier point of time, e.g., in the course of initialization or training of the probabilistic model), which here yields a validity probability of 0.85. Furthermore, a value of the instantaneous validity rate $\hat{\lambda}_{D2}$ is derived from the last re-computation (activity 13 of FIG. 6), which results only a validity probability of 0.62. Thus, the latest re-computation of, e.g., 1,000 pre-computed priced travel recommendations of share D2 indicated that only about 620 pre-computed priced travel recommendations have still been valid since the previous re-computation, but about 380 pre-computed priced travel recommendations were found to have been invalidated since the previous re-computation.

After having determined the current value of the instantaneous validity rate $\hat{\lambda}_{D2}$, the re-computation controller 2 performs a comparison between the instantaneous validity rate $\hat{\lambda}_{D2}$ and the value of the validity trend $\hat{\lambda}_{D2}$ (activity 14 of FIG. 6). As indicated by FIG. 10, this comparison may also be performed on the level of the validity probability values resulting from the different values of $\hat{\lambda}_{D2}$ and $\lambda_{D2}$. The re-computation controller 2 determines that the given threshold for the difference between the instantaneous validity rate $\lambda_{D2}$ and the validity trend $\lambda_{D2}$ (e.g., a validity probability difference of 0.1, 0.15 or 0.2) is exceeded.

Hence, the re-computation controller 2 initiates adaption of the validity probabilities of pre-computed priced travel recommendations of shares correlated with share D2 (activity 15 of FIG. 6). For example, as share E1 is correlated with share D2 at a medium level, the re-computation controller 2 adapts the validity probability of share E1 by reducing the value of validity probability by 12% from 0.95 to e.g., 0.83. Also share B1 is correlated to share D2, although this correlation may be less strong. Hence, the re-computation controller 2 also adapts the validity probability e.g., by ca. 9% from 0.87 to 0.79. Decreasing the validity probability may be achieved e.g., adapting the value of the validity trends ($\lambda_{E1}, \lambda_{B1}$), by modifying the timestamp of the last re-computation of the respective pre-computed priced travel recommendations or by storing an absolute or relative reduction value as an additional control data (e.g., in the example of share E1, a fixed and absolute validity probability reduction value of 0.12).

Later on, the re-computation controller 2 makes the next re-computation decision in order to select the pre-computed priced travel recommendations which are to be re-computed next in accordance with the re-computation strategy employed (activity 16 of FIG. 6). This decision is based on the decreased validity probabilities, i.e., e.g., on the decreased values of $\lambda_{E1}$ and $\lambda_{B1}$, which may cause an earlier re-computation of the pre-computed priced travel recommendations of shares E1 and B1 than without the adaption done by the re-computation controller 2. After the pre-computed priced travel recommendations in share E1 and share B1, respectively, have been re-computed, the values for $\hat{\lambda}_{E1}$ and $\lambda_{B1}$ are optionally newly determined (e.g., by employing the mechanisms of determining the empirical distribution function or the maximum likelihood estimation as described in detail above—activity 12 of FIG. 6) or, alternatively, reset to their previous values (as it may be expected that the validity of the pre-computed priced travel recommendations in share E1 and share B1 decrease as normal after the re-computation). Furthermore, also the values for $\hat{\lambda}_{E1}$ and $\hat{\lambda}_{B1}$ are determined again (activity 13 of FIG. 6) which again triggers the comparison of $\hat{\lambda}_{E1}$ and $\hat{\lambda}_{B1}$ with $\lambda_{E1}$ and $\lambda_{B1}$, respectively (activity 14 of FIG. 6), and potentially an adaption of the validity probabilities of correlated shares (activity 15 of FIG. 6).

Figure 11:
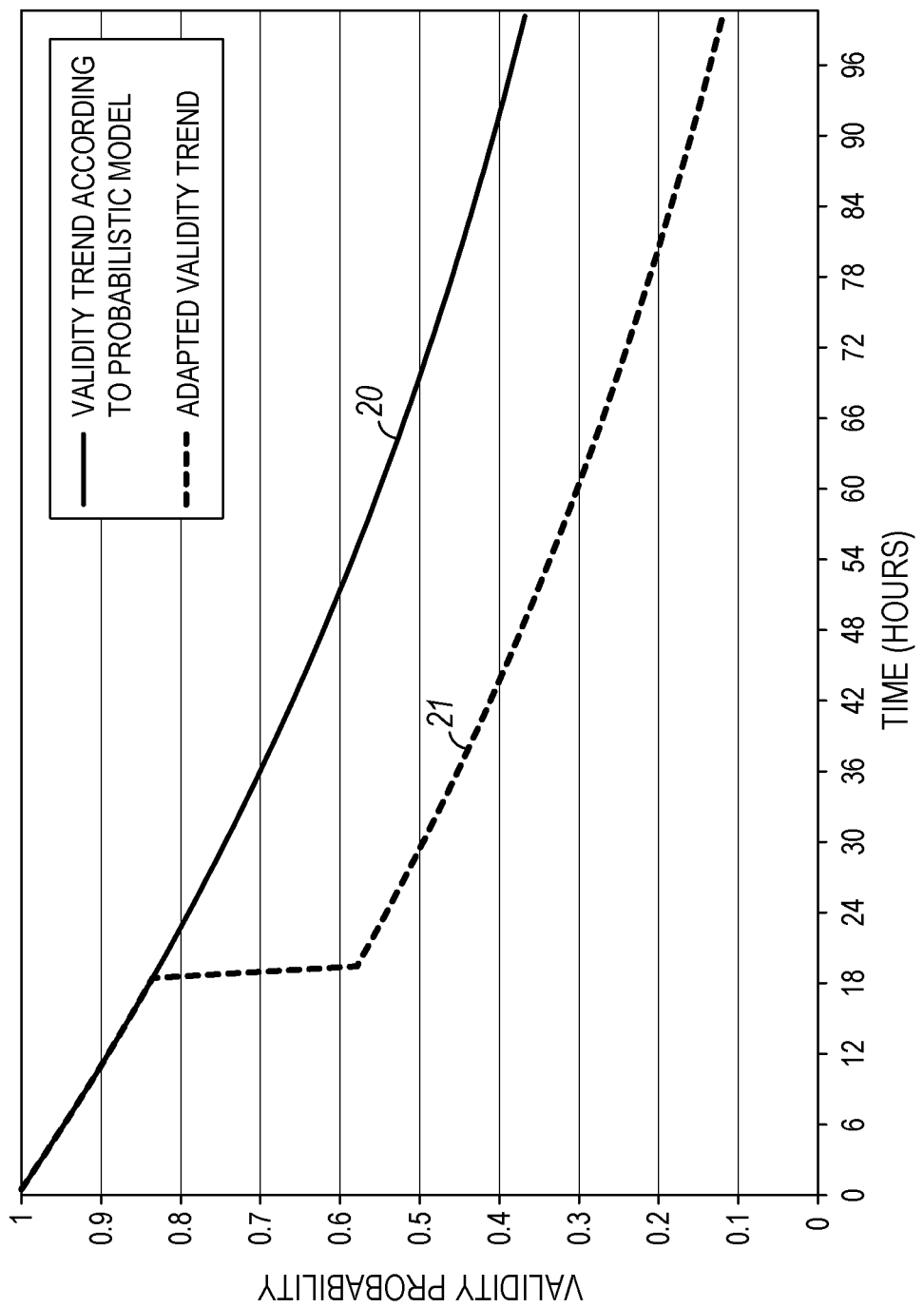
FIG. 11 visualizes the adaption of the modelled validity probability of a pre-computed search result after having detected a substantial difference between the validity trend and the instantaneous validity rate of another correlated pre-computed search result.

FIG. 11 visualizes the adaption of the validity probability associated with a pre-computed search result i (the term pre-computed search result i hereinafter covering both, an individual pre-computed search result as well as a set of pre-computed search results such as a share) as described above in conjunction with activity 15 of FIG. 6. In the example of FIG. 11, the thick straight line 20 represents a validity probability decreasing with a rate of 0.01 per hour (i.e., the pre-computed search result represented by line 20 remains valid over one hour with a probability of 99% or the 99% of the set of pre-computed search results represented by line 20 remain valid over one hour). Thus, line 20 visualizes the validity probability of pre-computed search result i approximated/modeled by the function $e^{-\lambda_i \cdot t_i} = e^{-0.01 \cdot t_i}$ ($\lambda_i = 0.01$ being a validity decrease rate of 1% per hour). Hence, 18 hours after the last re-computation of pre-computed search result i, the validity probability of the pre-computed search result is modeled as $e^{-0.001 \cdot 18} \approx 0.835$. At this point of time, the re-computation controller 2 determines that the difference between the instantaneous validity rate $\hat{\lambda}_j$ and the validity trend $\lambda_j$ of a pre-computed search result j being correlated with the pre-computed search result i is significantly exceeding the given difference threshold. As a consequence, the validity probability of the pre-computed search result i is reduced dependent on the amount of determined difference between the instantaneous validity rate $\hat{\lambda}_j$ and the validity trend $\lambda_j$ and, optionally, dependent on the level of correlation between i and j, in the example of FIG. from ca. 0.835 by 30% (≈0.25) to about 0.585. Resulting function 21 then approximates the new reduced validity probability of pre-computed search result i with the function $e^{-0.01\ \tau_i}-0.25$.

Figure 12:
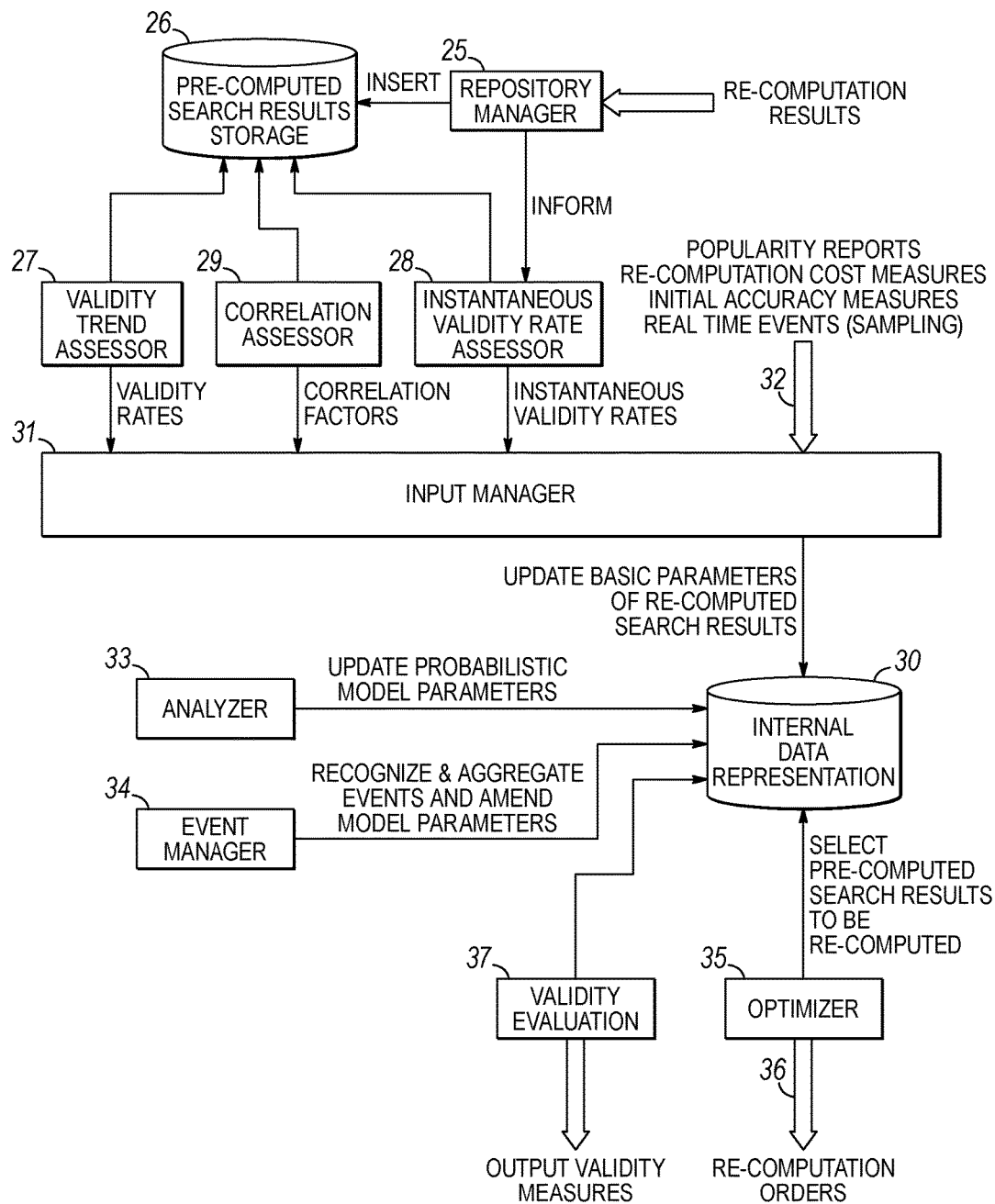
FIG. 12 depicts an exemplary internal structure of a re-computation controller.

FIG. 12 illustrates the internal architecture of an exemplary re-computation controller 2 implementing the methodologies described above. According to the example of FIG. 12, the re-computation controller 2 includes the following components.

Pre-computed search results storage 26 is a distributed data repository containing the history pre-computed search results computed by computation platform 3 over a given period of time such as several past months. The pre-computed search results are inserted to the by the storage 26 by the repository manager 25 which receives the re-computed search results from the computation platform 3.

Validity trend assessor 27: This component analyzes the differences between the successive re-computations of pre-computed search results and generates the validity trend values $\lambda_i$. The validity trend values $\lambda_i$ (as well as other control data associated with the pre-computed search results) are stored in the internal data representation 30. Furthermore, the validity trend values $\lambda_i$ are also transmitted to the input manager 31.

Instantaneous validity rate assessor 28: This component is triggered by the repository manager 25 each time the repository manager 25 receives a set of re-computed search results from the computation platform 3 and inserts the set of re-computed search results in the internal data representation 30. The instantaneous validity rate assessor 28 determines the instantaneous validity rate values $\hat{\lambda}_i$ by comparing the two last versions of each pre-computed search result. The instantaneous validity rate assessor 28 stores instantaneous validity rate values $\hat{\lambda}_i$ associated with the pre-computed search results in the Internal data representation 30. Furthermore, instantaneous validity rate values $\hat{\lambda}_i$ are also transmitted to the input manager 31.

Correlation assessor 29: This component determines the correlation between shares of pre-computed search results. It may also be responsible for managing the shares of pre-computed search results, i.e., subdividing the pre-computed search results into the shares in the first place and assigning newly created/computed pre-computed search results to the respective share (if the subdivision into shares is reflected by the database structure which does not have to be the case— as outlined above, the subdivision may be a purely logical split in accordance with given rules such as—in the example of the pre-computed search results being priced travel recommendations—priced travel recommendations of particular origin and destination and grouped into departure date time intervals such as all priced travel recommendations for a particular origin-destination pair departing between today and today+30 days (share D1), for the same origin-destination pair departing between today+31 days and today+60 days (share D2), and so on). The resulting correlation factors associated with the pre-computed search results shares are stored in the internal data representation 30. Furthermore, the correlation factors are also transmitted to the input manager 31.

Internal data representation component 30: This component provides tools to build, store, update and access matrixes of control data representing the pre-computed search results stored in the search platform 4. The main function of internal data representation component 30 is to provide a "control data mirror" of the pre-computed search results stored in the search platform 4 serving as the basis for analyzing the pre-computed search results in order to decide which of the pre-computed search results are to be re-computed during the next re-computation cycle. More precisely, the internal data representation component 30 does not hold a one-to-one copy of the pre-computed search results as stored in the search platform 4, but an appropriate control data representation which does not have to include the pre-computed search results themselves as stored in the search platform 4, but, on the other hand, includes control data associated with the pre-computed search results such as the times of their last re-computation and, in particular, the validity trend values $\lambda_i$ and the instantaneous validity rate values $\hat{\lambda}_i$.

Input manager 31: This component inputs control data from various sources including the validity trend assessor 27, the instantaneous validity rate assessor 28 and the correlation assessor 29. Additional, the input manager 31 receives further control data used to maintain the probabilistic model such as popularity report from a popularity database or data source, re-computation costs measure from a re-computation costs database or data source, initial accuracy measures from an initial accuracy database or data source, and/or real-time event signals from sources indicating real-time events potentially influencing the validity of the pre-computed search results. This further control data is input via interface 32 which schematically represents the connection(s) of the input manager 31 to any of the aforementioned databases or data sources. The input manager 31 converts the incoming control data into the appropriate data formats and updates corresponding control data matrixes representing the pre-computed search results as stored by the internal data representation component 30.

Analyzer 33: This component computes intermediate data matrixes implied by the probabilistic model (i.e., the validity probabilities of the pre-computed search results derived from the control data of the probabilistic model such as age, validity trends, popularity, initial accuracy) on the basis of the matrices stored by the internal data representation component 30.

Events manager 34: This component aggregates information on real-time events information and amends the validity predictions given by the probabilistic model accordingly. Furthermore, this component is enhanced to recognize asynchronous events not externally signaled via interface 32 based on the instantaneous validity rate values $\hat{\lambda}_i$. To this end, the events manager 34 performs the comparison between the instantaneous validity rate values $\hat{\lambda}_i$ and the validity trend values $\lambda_I$ of shares correlated to the recently re-computed search results and amends the probabilistic model parameters (the validity probabilities) if comparison indicates that the instantaneous validity rate values $\hat{\lambda}_i$ are too far from the validity trend values $\lambda_i$.

Optimizer 35: This component executes the re-computation strategy, for example a re-computation frequency oriented re-computation and the iterative selection of pre-computed search results taking into account varying computation costs of interrelated pre-computed search results as described in detail in European Application 14290040.6. After having determined the pre-computed search results to be recomputed, the optimizer 35 generates re-computation orders and issues these re-computation orders to the computation platform 3 via interface 36. Furthermore, the optimizer 35 updates the re-computation time of these pre-computed search results stored in the internal data representation component 30.

The validity evaluation module 37 is a plug-in which generates statistics of the validity of the pre-computed search results over time based on the parameters of the probabilistic model including the validity trend values $\lambda_i$. The statistics are output to an external evaluation display and/or for presentation to a user.

Figure 13:
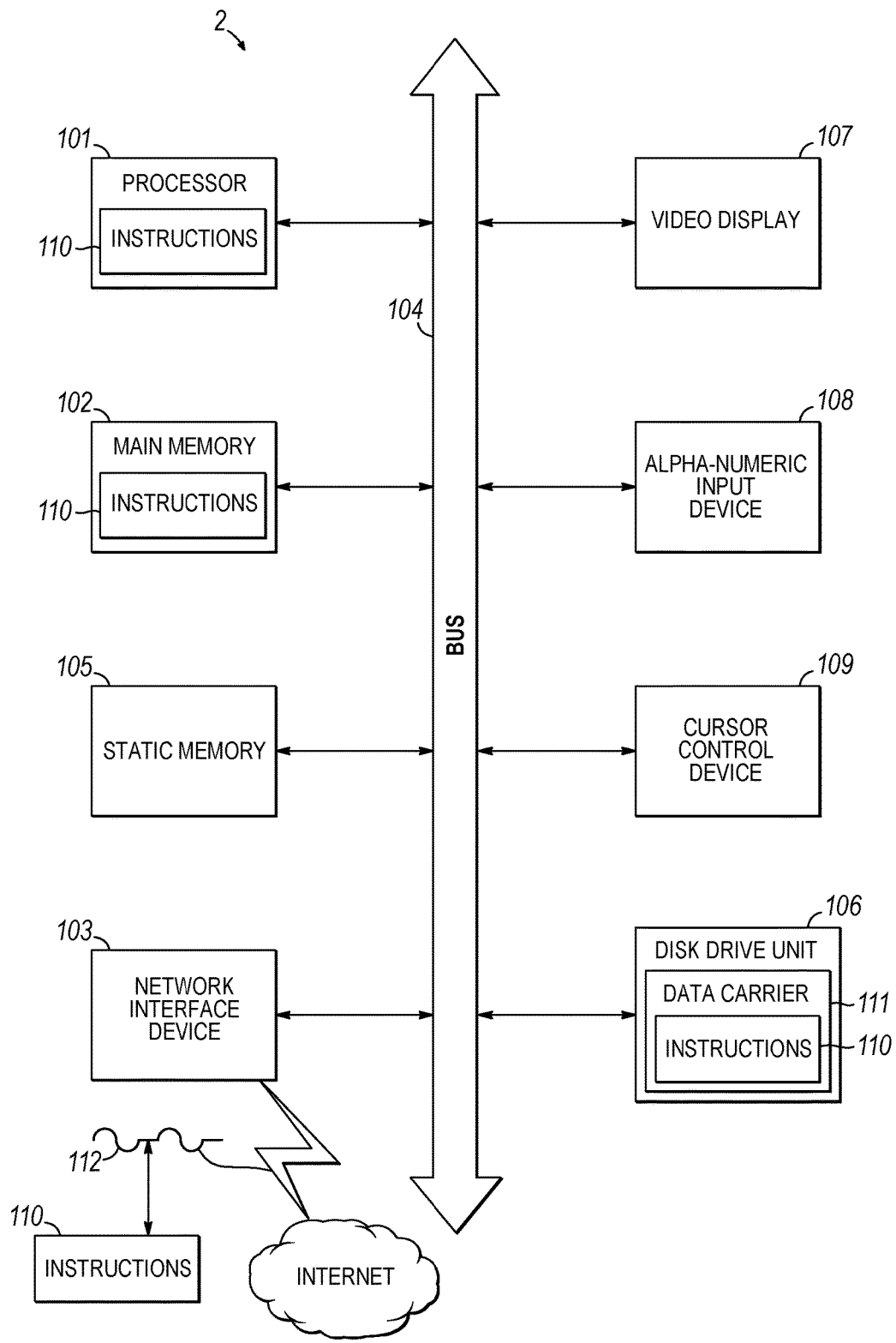
FIG. 13 is an exemplary schematic view of the internal architecture of a computer/server implementing a configuration as described herein.

Finally, FIG. 13 is a diagrammatic representation of the internal structure of a computer or server 120 which implements the product configuration mechanisms described herein. The computer or server 120 is arranged to execute a set of instructions, to cause it to perform any of the methodologies explained above. The computer or server 120 includes a processor 121, a main memory 122 and, optionally, a wireless network interface 123 (such as a Wi-Fi and/or Bluetooth interface) and/or a 2G/3G/4G mobile network interface device, all of which communicate with each other via a bus 124. It further includes a static memory 125, e.g., non-removable flash and/or solid state drive and/or a removable Micro or Mini SD card, which permanently stores the software enabling computer/server 120 to execute its functions, such as storing a product model including pre-determined scope variables, generating Rule BDDs, allowing the selection of values for the scope variables, restricting the product model e.g., to a Tree-of-BDDs and allowing a user to iteratively select values for non-scope variables in order to finish configuration, etc. and to optionally communicate with client computers/devices within a local or wide area network via its wired and/or wireless network interface device 123. Furthermore, computer/server 120 includes a display 127, a user interface control module 129 and an alpha-numeric and cursor input device 128. Optionally, additional I/O interfaces 126 such as card reader and USB interfaces may be present. An executable set of instructions (i.e., software) 130 embodying any one, or all, of the methodologies described above, resides completely, or at least partially, permanently in the non-volatile memory 125. When being executed, respective process data resides in the main memory 122 and/or the processor 121. The software 130 may further be transmitted or received as a propagated signal 132 through the wired or wireless network interface device 123 from/to a software server within the local area network or the Internet.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer readable program instructions for carrying out operations of the embodiments of the invention may be, for example, assembly language or either source code or object code written in any combination of one or more programming languages.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions/acts specified in the flowcharts, sequence diagrams, and/or block diagrams. The computer program instructions may be provided to one or more processors of a general purpose computer, special purpose computer, or other programmable data processing apparatus to produce a machine, such that the instructions, which execute via the one or more processors, cause a series of computations to be performed to implement the functions and/or acts specified in the flowcharts, sequence diagrams, and/or block diagrams.

In certain alternative embodiments, the functions and/or acts specified in the flowcharts, sequence diagrams, and/or block diagrams may be re-ordered, processed serially, and/or processed concurrently without departing from the scope of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

We claim:

1. A re-computation controller for managing pre-computed priced recommendations in a database environment maintained by a first platform, the pre-computed priced recommendations being subdivided into a plurality of shares of related pre-computed priced recommendations including a first share D, the system comprising:
   one or more processors; and
   a memory including instructions that, when executed by the one or more processors, cause the re-computation controller to control re-computation of the pre-computed priced recommendations maintained by the first platform on the basis of validity probabilities being associated with the pre-computed priced recommendations by:
   determining a validity trend $\lambda_i$ indicating a change rate of the validity probability of the pre-computed search result i over time, the pre-computed search result i being a member of the first share D, the validity trend $\lambda_i$ being derived from at least three past re-computations of i;
   determining an instantaneous validity rate $\hat{\lambda}_i$ for the pre-computed search result i, the instantaneous validity rate $\hat{\lambda}_i$ being derived from the two latest re-computations of the related pre-computed priced recommendations included in the first share D;
   in response to determining a difference between the instantaneous validity rate $\hat{\lambda}_i$ and the validity trend $\lambda_i$ exceeding a given extent, adjusting validity probabilities being associated with other pre-computed priced recommendations included in a second share D' being correlated to the first share D; and
   issuing re-computation orders to a second platform to re-compute a part of the pre-computed priced recommendations on the basis of the validity probabilities associated with the pre-computed priced recommendations.

2. The system of claim 1 wherein the validity probabilities are decreased in response to determining the difference between the instantaneous validity rate $\hat{\lambda}_i$ and the validity trend $\lambda_i$ exceeding a given extent, wherein the amount of decrease depends on the amount of the difference.

3. The system of claim 1 wherein the validity probabilities being associated with the other pre-computed priced recommendations included in the second share D' are adjusted in dependency of a degree of correlation between the first share D and the second share D'.

4. The system of claim 1 wherein instructions that, when executed by the one or more processors, cause the re-computation controller to control re-computation of the pre-computed priced recommendations on the basis of validity probabilities being associated with the pre-computed priced recommendations by determining the validity trend $\lambda_i$ and/or determining the instantaneous validity rate $\hat{\lambda}_i$ comprises:
   instructions that establish an empirical distribution function of the probability for the pre-computed search result i to stay valid over time and regressing the empirical distribution function to fit a model function.

5. A method for managing pre-computed priced recommendations, the pre-computed priced recommendations being subdivided into a plurality of shares of related pre-computed priced recommendations including a first share D, the method being performed in a database environment that includes at least a first platform for maintaining pre-computed priced recommendations, a re-computation controller for controlling re-computation of the pre-computed priced recommendations on the basis of validity probabilities being associated with the pre-computed priced recommendations, and a second platform for re-computing the pre-computed priced recommendations, the method comprising:
   determining, by the re-computation controller, a validity trend $\lambda_i$ indicating a change rate of the validity probability of a pre-computed search result i over time, the pre-computed search result i being a member of the first share D, the validity trend $\lambda_i$ being derived from at least three past re-computations of i;
   determining, by the re-computation controller, an instantaneous validity rate $\hat{\lambda}_i$ for the pre-computed search result i, the instantaneous validity rate $\hat{\lambda}_i$ being derived from the two latest re-computations of the related pre-computed priced recommendations included in the first share D;
   in response to determining a difference between the instantaneous validity rate $\hat{\lambda}_i$ and the validity trend $\lambda_i$ exceeding a given extent, adjusting, by the re-computation controller, the validity probabilities associated with other pre-computed priced recommendations included in a second share D' being correlated to the first share D; and
   issuing, by the re-computation controller, re-computation orders to the second platform to re-compute a part of the pre-computed priced recommendations on the basis of the validity probabilities associated with the pre-computed priced recommendations.

6. The method of claim 5 wherein the validity probabilities are decreased in response to determining the difference between the instantaneous validity rate $\hat{\lambda}_i$ and the validity trend $\lambda_i$ exceeding a given extent, wherein the amount of decrease depends on the amount of the difference.

7. The method of claim 5 wherein the validity probabilities being associated with the other pre-computed priced recommendations included in the second share D' are adjusted in dependency of a degree of correlation between the first share D and the second share D'.

8. The method of claim 7 wherein the degree of correlation between the first share D and the second share D' is determined by a linear regression to model a relation between the difference between a validity trend $\lambda_D$ and an instantaneous validity rate $\hat{\lambda}_D$, $\lambda_D$ indicating a change rate of the probability of the pre-computed priced recommendations in the first share D, $\hat{\lambda}_D$ being an instantaneous validity rate relating to the pre-computed priced recommendations in the first share D; and
   a difference between a validity trend $\lambda_{D'}$ and an instantaneous validity rate $\hat{\lambda}_{D'}$, $\lambda_{D'}$ indicating a change rate of the validity probability of the pre-computed priced recommendations in the second share D', $\hat{\lambda}_{D'}$ being an instantaneous validity rate relating to the pre-computed priced recommendations in the second share D'.

9. The method of claim 8 wherein the degree of correlation between the first share D and the second share D' is given by the relation $$\hat{\lambda}_{D'} - \lambda_{D'} \approx \frac{\sigma_{DD'}}{\sigma_D^2}(\hat{\lambda}_D - \lambda_D),$$

wherein $\sigma^2_D$ a variance of the validity rate $\hat{\lambda}_D$ over time and $\sigma_{DD'}$ denotes a covariance between the validity trend $\lambda_D$, and the instantaneous validity rate $\hat{\lambda}_{D'}$ over time.

10. The method of claim 5 wherein the validity trend $\lambda_i$ is derived from a common validity trend $\lambda_{D_{avg}}$ for the pre-computed priced recommendations of the first share D.

11. The method of claim 5 wherein at least one of determining the validity trend $\lambda_I$ and determining the instantaneous validity rate $\hat{\lambda}_i$ comprises a maximum likelihood estimation of an expected value for $\lambda_I$ and $\hat{\lambda}_i$, respectively, the maximum likelihood estimation being based on a sample series of re-computation pairs, each re-computation pair including a time since the last re-computation of i and a flag indicating whether or not i has changed since the last re-computation of i.

12. The method of claim 11 further comprising:
calculating a confidence value for the estimated validity trend $\lambda_i$ and/or the estimated instantaneous validity rate $\hat{\lambda}_i$ estimated by using the maximum likelihood estimation.

13. The method of claim 5 wherein determining the validity trend $\lambda_i$ and/or determining the instantaneous validity rate $\hat{\lambda}_i$ comprises:
establishing an empirical distribution function of the probability for the pre-computed search result i to stay valid over time and regressing the empirical distribution function to fit a model function.

14. The method of claim 13 wherein the empirical distribution function for the validity trend $\lambda_i$ and/or the instantaneous validity rate $\hat{\lambda}_i$ is regressed to fit an exponential function of the form $f(t)=e^{-\lambda_i t}$ and/or $f(t)=e^{-\hat{\lambda}_i t}$).

15. The method of claim 5 wherein at least one of determining the validity trend $\lambda_I$ and determining the instantaneous validity rate $\hat{\lambda}_i$ utilizes MapReduce processes.

16. The method of claim 5 wherein the instantaneous validity rate $\hat{\lambda}_i$ for the pre-computed search result i is determined in response to a re-computation of the pre-computed priced recommendations included in the first share D.

17. A computer program product comprising:
a non-transitory computer-readable storage medium; and
instructions stored on the non-transitory computer-readable storage medium that, when executed by a processor, cause the processor to control re-computation in a database environment of the pre-computed priced recommendations maintained by a first platform on the basis of validity probabilities being associated with the pre-computed priced recommendations by:
determining a validity trend $\lambda_i$ indicating a change rate of the validity probability of the pre-computed search result i over time, the pre-computed search result i being a member of the first share D, the validity trend $\lambda_i$ being derived from at least three past re-computations of i;
determining an instantaneous validity rate $\hat{\lambda}_i$ for the pre-computed search result i, the instantaneous validity rate $\hat{\lambda}_i$ being derived from the two latest re-computations of the related pre-computed priced recommendations included in the first share D;
in response to determining a difference between the instantaneous validity rate $\hat{\lambda}_i$ and the validity trend $\lambda_i$ exceeding a given extent, adjusting validity probabilities being associated with other pre-computed priced recommendations included in a second share D' being correlated to the first share D; and
issuing re-computation orders to a second platform to re-compute a part of the pre-computed priced recommendations on the basis of the validity probabilities associated with the pre-computed priced recommendations.

* * * * *